(12) United States Patent
Yamashita et al.

(10) Patent No.: US 12,351,682 B2
(45) Date of Patent: Jul. 8, 2025

(54) SURFACE-TREATING AGENT

(71) Applicant: DAIKIN INDUSTRIES, LTD., Osaka (JP)

(72) Inventors: Tsuneo Yamashita, Osaka (JP); Takeshi Maehira, Osaka (JP); Hisashi Mitsuhashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 589 days.

(21) Appl. No.: 17/590,068

(22) Filed: Feb. 1, 2022

(65) Prior Publication Data

US 2022/0153929 A1    May 19, 2022

Related U.S. Application Data

(63) Continuation of application No. PCT/JP2020/029346, filed on Jul. 30, 2020.

(30) Foreign Application Priority Data

Aug. 2, 2019   (JP) .............................. 2019-143001
Jan. 17, 2020  (JP) .............................. 2020-006168

(51) Int. Cl.

| C08G 65/336 | (2006.01) |
| C08G 65/00  | (2006.01) |
| C09D 5/16   | (2006.01) |
| C09K 3/18   | (2006.01) |

(52) U.S. Cl.
CPC ......... C08G 65/336 (2013.01); C08G 65/007 (2013.01); C09D 5/16 (2013.01); C09K 3/18 (2013.01)

(58) Field of Classification Search
CPC .......... C09D 171/00; C09D 5/00; C09D 7/20; C09D 5/16; C08G 65/336; C08G 65/007; C08G 65/226; C08G 77/46; C07F 7/18; C07F 7/122; C09K 3/18
See application file for complete search history.

(56) References Cited

U.S. PATENT DOCUMENTS

| 11,193,026 B2 | 12/2021 | Mitsuhashi et al. |
| 2015/0307719 A1* | 10/2015 | Mitsuhashi ............ C07F 7/188 428/447 |
| 2016/0304665 A1 | 10/2016 | Sakoh et al. |
| 2019/0002635 A1 | 1/2019 | Mitsuhashi et al. |
| 2019/0390009 A1 | 12/2019 | Mitsuhashi et al. |
| 2021/0189174 A1 | 6/2021 | Katayama et al. |
| 2021/0199857 A1 | 7/2021 | Honda |
| 2021/0230422 A1 | 7/2021 | Honda |
| 2021/0230446 A1* | 7/2021 | Tokunaga ............... B32B 27/30 |

FOREIGN PATENT DOCUMENTS

| CN | 109651941 A | 4/2019 |
| DE | 19606011 A1 | 8/1997 |
| EP | 1997824 A1 | 12/2008 |
| JP | 2014-218639 A | 11/2014 |
| JP | 2016-017176 A | 2/2016 |
| JP | 2016-171176 A | 9/2016 |
| JP | 2016-204656 A | 12/2016 |
| JP | 2017-082194 A | 5/2017 |
| WO | 2018/168497 A1 | 9/2018 |
| WO | 2018/216404 A1 | 11/2018 |
| WO | 2019/088116 A1 | 5/2019 |
| WO | 2019/088133 A1 | 5/2019 |
| WO | 2020/040037 A1 | 2/2020 |

OTHER PUBLICATIONS

Extended European Search Report issued on Jul. 5, 2023 in application No. 20850270.8.
International Preliminary Report on Patentability with Translation of the Written Opinion dated Feb. 8, 2022 in International Application No. PCT/JP2020/029346.
International Search Report of PCT/JP2020/029346 dated Oct. 13, 2020 [PCT/ISA/210].

* cited by examiner

*Primary Examiner* — Mark S Kaucher
(74) *Attorney, Agent, or Firm* — Sughrue Mion, PLLC

(57) ABSTRACT

A surface-treating agent containing a fluoropolyether group-containing silane compound (A) and a fluoropolyether group-containing silane compound (B) represented by formula (1) or (2) below:

$$R^{F1}{}_\alpha - X^A - R^{Si}{}_\beta \quad (1)$$

$$R^{Si}{}_\gamma - X^A - R^{F2} - X^A - R^{Si}{}_\gamma \quad (2)$$

wherein $R^{F1}$, $X^A$, $R^{Si}$, $R^{F2}$, $\alpha$, $\beta$ and $\gamma$ are as defined herein.

19 Claims, No Drawings

SURFACE-TREATING AGENT

CROSS REFERENCE TO RELATED APPLICATIONS

This application is a Rule 53(b) Continuation of PCT Application No. PCT/JP2020/029346 filed on Jul. 30, 2020, claiming priority based on Japanese Patent Application No. 2019-143001 filed on Aug. 2, 2019 and Japanese Patent Application No. 2020-006168 filed on Jan. 17, 2020, the respective disclosures of which are incorporated herein by reference in their entirety.

TECHNICAL FIELD

The present disclosure relates to a surface-treating agent.

BACKGROUND ART

Certain types of fluorine-containing silane compounds are known to be capable of providing excellent water-repellency, oil-repellency, antifouling property, and the like when used in surface treatment of a base material. A layer formed from a surface-treating agent containing a fluorine-containing silane compound (hereinafter, also referred to as a "surface-treating layer") is applied as a so-called functional thin film to a large variety of base materials such as glass, plastics, fibers, and building materials.

A known such fluorine-containing compound is a perfluoropolyether group-containing silane compound having a perfluoropolyether group in the molecular backbone and a hydrolyzable group bonding to a Si atom at the molecular terminal or in the terminal part (Patent Literatures 1 and 2).

CITATION LIST

Patent Literature

Patent Literature 1: JP 2014-218639 A
Patent Literature 2: JP 2017-082194 A

SUMMARY

The present disclosure provides [1] below. [1] A surface-treating agent comprising a fluoropolyether group-containing silane compound (A) and a fluoropolyether group-containing silane compound (B) which are represented by formula (1) or (2):

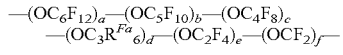

wherein
$R^{F1}$ is $Rf^1$—$R^F$—$O_q$—;
$R^{F2}$ is —$Rf^2$—$R^F$—$O_q$—;
$Rf^1$ is each independently at each occurrence a $C_{1-16}$ alkyl group optionally substituted with one or more fluorine atoms;
$Rf^2$ is a $C_{1-6}$ alkylene group optionally substituted with one or more fluorine atoms;
$R^F$ is a divalent fluoropolyether group;
p is 0 or 1;
q is each independently at each occurrence 0 or 1;
$X^A$ is each independently a single bond or a di- to decavalent organic group;
$R^{Si}$ is each independently at each occurrence a group having a Si atom bonded to a hydrolyzable group;

α is an integer of 1 to 9;
β is an integer of 1 to 9; and
γ is each independently an integer of 1 to 9;
wherein, in the fluoropolyether group-containing silane compound (A),
$R^F$ is represented by $R^{F1}$;
$R^{F11}$ is a fluoropolyether group represented by formula:

wherein $R^{Fa}$ is each independently at each occurrence a hydrogen atom, a fluorine atom, or a chlorine atom; and
a, b, c, d, e and f are each independently at each occurrence an integer of 0 to 200, the sum of a, b, c, d, e and f is 1 or more, and the occurrence order of the respective repeating units in parentheses with a, b, c, d, e or f is not limited in the formula;
$R^{Si}$ is each independently at each occurrence represented by the following formula (S11) or (S12):

$$—C(Z^1—SiR^{21}_{p1}R^{22}_{q1})_3 \quad (S11)$$

$$—Si(Z^1—SiR^{21}_{p1}R^{22}_{q1}) \quad (S12)$$

wherein
$Z^1$ is each independently at each occurrence a $C_{1-6}$ alkylene group, —$(CH_2)_{z1}$—O—$(CH_2)_{z2}$—, or —$(CH_2)_{z3}$-phenylene-$(CH_2)_{z4}$—;
z1 is independently at each occurrence an integer 1 to 6;
z2 is independently at each occurrence an integer 0 to 6;
z3 and z4 are each independently at each occurrence an integer of 0 to 6;
$R^{21}$ is each independently at each occurrence a hydroxyl group or a hydrolyzable group;
$R^{22}$ is each independently at each occurrence a hydrogen atom or a monovalent organic group;
p1 is each independently at each occurrence an integer of 1 to 3; and
q1 is each independently at each occurrence an integer of 0 to 2; and
in the fluoropolyether group-containing silane compound (B),
$R^F$ is represented by $R^{F21}$;
$R^{F21}$ is represented by formula:

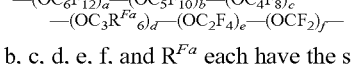

a, b, c, d, e, f, and $R^{Fa}$ each have the same meaning as in $R^{F11}$, provided that the structure of each of the repeating units in $R^{F21}$ is same as the structure of each of the repeating units in $R^{F1}$; and
$R^{Si}$ is each independently at each occurrence represented by the following formula (S2), (S3), or (S4):

wherein
$Z^1$, $R^{21}$, $R^{22}$, p1, and q1 have the same meaning as in formula (S11) and formula (S12); and
$R^{e1}$ is each independently a hydrogen atom, a hydroxyl group, or a monovalent organic group,
provided that a case is excluded, where $R^{Si}$ in the fluoropolyether group-containing silane compound (A) is represented by formula (S12) and $R^{Si}$ in the fluoropolyether group-containing silane compound (B) is represented by formula (S3), and the structure or the value of $R^{f1}$, $R^{f2}$, p, q, $R^{F11}$, $X^A$, α, β, γ, $Z^1$, $R^{21}$, $R^{22}$, p1, and q1 of the fluoropolyether group-containing silane compound (A) are completely same as the structure or the value of $R^{f1}$, $R^{f2}$, p, q, $R^{F21}$, $X^A$, α, β, γ, $Z^1$, $R^{21}$, $R^{22}$, p1, and q1 of the fluoropolyether group-containing silane compound (B), respectively.

Advantageous Effect

The surface-treating agent of the present disclosure may contribute to form a surface-treating layer having good friction durability.

DESCRIPTION OF EMBODIMENTS

The term "monovalent organic group", as used herein, refers to a monovalent group containing a carbon. The monovalent organic group is not limited, and may be a hydrocarbon group or a derivative thereof. The derivative of hydrocarbon group refers to a group that has one or more of N, O, S, Si, amide, sulfonyl, siloxane, carbonyl, carbonyloxy, and the like at the terminal or in the molecular chain of the hydrocarbon group. The term "organic group" refers to a monovalent organic group.

The term "di- to decavalent organic group" refers to a di- to decavalent group containing carbon. The di- to decavalent organic group may be, but is not limited to, a di- to decavalent group obtained by further removing 1 to 9 hydrogen atoms from an organic group. For example, the divalent organic group may be, but is not limited to, a divalent group obtained by further removing one hydrogen atom from an organic group.

The term "hydrocarbon group", as used herein, refers to a group that contains a carbon and a hydrogen and that is obtained by removing one hydrogen atom from a hydrocarbon. The hydrocarbon group is not limited, and examples include a $C_{1-20}$ hydrocarbon group optionally substituted with one or more substituents, such as an aliphatic hydrocarbon group and an aromatic hydrocarbon group. The "aliphatic hydrocarbon group" may be either straight, branched, or cyclic, and may be either saturated or unsaturated. The hydrocarbon group may contain one or more ring structures.

The substituent of the "hydrocarbon group", as used herein, is not limited, and examples include one or more groups selected from a halogen atom, and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group, each of which is optionally substituted with one or more halogen atoms.

The term "hydrolyzable group", as used herein, refers to a group which is able to undergo a hydrolysis reaction, i.e., represents a group that can be removed from the main backbone of a compound by a hydrolysis reaction. Examples of the hydrolyzable group include $-OR^h$, $-OCOR^h$, $-O-N=CR^h{}_2$, $-NR^h{}_2$, $-NHR^h$, and halogen (in these formulae, $R^h$ represents a substituted or unsubstituted $C_{1-4}$ alkyl group).

(Surface-Treating Agent)

Hereinafter, a surface-treating agent of the present disclosure will be described.

The surface-treating agent of the present disclosure contains fluoropolyether group-containing silane compounds (A) and (B). The fluoropolyether-containing silane compounds (A) and (B) are fluoropolyether-containing silane compounds represented by the following formula (1) or (2):

In formula (1), $R^{F1}$ is each independently at each occurrence $Rf^1-R^F-O_q-$.

In the formula, $Rf^1$ is each independently at each occurrence a $C_{1-16}$ alkyl group optionally substituted with one or more fluorine atoms.

In the $C_{1-16}$ alkyl group optionally substituted with one or more fluorine atoms, the "$C_{1-16}$ alkyl group" may be straight or branched, and is preferably a straight or branched $C_{1-6}$ alkyl group, in particular, $C_{1-3}$ alkyl group, more preferably a straight $C_{1-6}$ alkyl group, in particular, $C_{1-3}$ alkyl group.

$Rf^1$ is preferably a $C_{1-16}$ alkyl group and that is substituted with one or more fluorine atoms, more preferably a $CF_2H-C_{1-15}$ perfluoroalkylene group, and still more preferably a $C_{1-16}$ perfluoroalkyl group.

The $C_{1-16}$ perfluoroalkyl group may be straight or branched, and is preferably a straight or branched $C_{1-6}$ perfluoroalkyl group, in particular $C_{1-3}$ perfluoroalkyl group, more preferably a straight $C_{1-6}$ perfluoroalkyl group, in particular $C_{1-3}$ perfluoroalkyl group, and specifically $-CF_3$, $-CF_2CF_3$, or $-CF_2CF_2CF_3$.

Preferably, $Rf^1$ in the fluoropolyether group-containing silane compound (A) described later has the same structure as $Rf^1$ in the fluoropolyether group-containing silane compound (B).

In formula (2), $R^{F2}$ is $-Rf^2{}_p-R^F-O_q-$.

In the formula, $Rf^2$ is a $C_{1-6}$ alkylene group optionally substituted with one or more fluorine atoms.

The "$C_{1-6}$ alkylene group" in the $C_{1-6}$ alkylene group optionally substituted with one or more fluorine atoms may be straight or branched, and is preferably a straight or branched $C_{1-3}$ alkylene group, more preferably a straight $C_{1-3}$ alkylene group.

$Rf^2$ is preferably a $C_{1-6}$ alkylene group substituted with one or more fluorine atoms, more preferably a $C_{1-6}$ perfluoroalkylene group, and still more preferably a $C_{1-3}$ perfluoroalkylene group.

The $C_{1-6}$ perfluoroalkylene group may be straight or branched, and is preferably a straight or branched $C_{1-3}$ perfluoroalkylene group, more preferably a straight $C_{1-3}$ perfluoroalkyl group, and specifically $-CF_2-$, $-CF_2CF_2-$, or $-CF_2CF_2CF_2-$.

Preferably, $Rf^2$ in the fluoropolyether group-containing silane compound (A) described later has the same structure as $Rf^2$ in the fluoropolyether group-containing silane compound (B).

In the formula, p is 0 or 1. In one embodiment, p is 0. In another embodiment, p is 1.

In the formula, q is each independently at each occurrence 0 or 1. In one embodiment, q is 0. In another embodiment, q is 1.

In the formulae (1) and (2), $R^F$ is each independently at each occurrence a divalent fluoropolyether group.

In the formula (1), α is an integer of 1 to 9, and β is an integer of 1 to 9. These α and β may be varied in the valence number of $X^A$. The sum of α and β is equal to the valence number of $X^A$. For example, when $X^A$ is a decavalent organic group, the sum of α and β is 10, and, for example, α is 9 and β is 1, α is 5 and β is 5, or α is 1 and β is 9. Further, when $X^A$ is a divalent organic group, α and β is 1.

In the formula (2), γ is an integer of 1 to 9. γ may be varied in the valence number of $X^A$. That is, γ is a value obtained by subtracting 1 from the valence number of $X^A$.

In the formulae (1) and (2), $X^A$ is interpreted as a linker, connecting a fluoropolyether moiety ($R^{F1}$ and $R^{F2}$) which mainly provides water-repellency and surface lubricity, and the like, and a moiety ($R^{Si}$) providing binding ability to a base material. $X^A$ may be a single bond or any organic group as long as the compounds represented by formulae (1) and (2) can stably exist.

$X^A$ is each independently a single bond or a di- to decavalent organic group.

The structure of $X^A$ in the fluoropolyether group-containing silane compound (A) described later may be same as the structure of $X^A$ in the fluoropolyether group-containing silane compound (B).

In one embodiment, the structure of $X^A$ in the fluoropolyether group-containing silane compound (A) is different from the structure of $X^A$ in the fluoropolyether group-containing silane compound (B).

The di- to decavalent organic group in $X^A$ is preferably a di- to octavalent organic group. In one embodiment, the di- to decavalent organic group is preferably a di- to tetravalent organic group, and more preferably a divalent organic group. In another embodiment, the di- to decavalent organic group is preferably a tri- to octavalent organic group, and more preferably a tri- to hexavalent organic group.

In one embodiment, $X^A$ is a single bond or a divalent organic group, α is 1, and β is 1.

In one embodiment, $X^A$ is a single bond or a divalent organic group, and γ is 1.

In one embodiment, $X^A$ is a tri- to hexavalent organic group, α is 1, and β is 2 to 5.

In one embodiment, $X^A$ is a tri- to hexavalent organic group, and γ is 2 to 5.

In one embodiment, $X^A$ is a trivalent organic group, α is 1, and β is 2.

In one embodiment, $X^A$ is a trivalent organic group, and γ is 2.

When $X^A$ is a single bond or a divalent organic group, formulae (1) and (2) are represented by the following formulae (1') and (2').

$$R^{F1}-X^A-R^{Si} \quad (1')$$

$$R^{Si}-X^A-R^{F2}-X^A-R^{Si} \quad (2')$$

In one embodiment, $X^A$ is a single bond.

In one embodiment, $X^A$ is a divalent organic group.

In one embodiment, examples of $X^A$ include a single bond or a divalent organic group represented by the following formula:

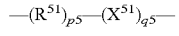

wherein
$R^{51}$ represents a single bond, $-(CH_2)_{s5}-$ or an o-, m-, or p-phenylene group, and is $-(CH_2)_{s5}-$ in one embodiment, and is a single bond in one embodiment.
s5 represents an integer of 1 to 20, preferably 1 to 6, more preferably 1 to 3 and still further preferably 1 or 2,
$X^{51}$ represents $-(X^{52})_{15}-$,
$X^{52}$ each independently at each occurrence represents a group selected from the group consisting of $-O-$, $-S-$, an o-, m- or p-phenylene group, $-C(O)-$, $-C(O)O-$, $-Si(R^{53})_2-$, $-(Si(R^{13})_2O)_{m5}$ $-Si(R^{53})_2-$, $-CONR^{54}-$, $-O-CONR^{54}-$, $-NR^{54}-$, and $-(CH_2)_{n5}-$, and for example, represents a group selected from the group consisting of $-CONR^{54}-$ and $-O-CONR^{54}-$, and in one embodiment, represents a group selected from the group consisting of $-O-$, $-C(O)-$, $-CONR^{54}-$, and $-O-CONR^{54}-$, $R^{53}$ each independently at each occurrence represents a phenyl group, a $C_{1-6}$ alkyl group, or a $C_{1-6}$ alkoxy group, and is preferably a phenyl group or a $C_{1-6}$ alkyl group, and more preferably a methyl group, $R^{54}$ each independently at each occurrence represents a hydrogen atom, a phenyl group or a $C_{1-6}$ alkyl group (preferably a methyl group), m5 is each independently at each occurrence an integer of 1 to 100 and preferably an integer of 1 to 20, n5 is each independently at each occurrence an integer of 1 to 20, preferably an integer of 1 to 6, and more preferably an integer of 1 to 3, l5 is an integer of 1 to 10, preferably an integer of 1 to 5, and more preferably an integer of 1 to 3, p5 is 0 or 1, and q5 is 0 or 1, provided that at least one of p5 and q5 is 1, and the occurrence order of the respective repeating units in parentheses with p5 or q5 is not limited.

$X^A$ (typically, a hydrogen atom of $X^A$) herein is optionally substituted with one or more substituents selected from a fluorine atom, a $C_{1-3}$ alkyl group, and a $C_{1-3}$ fluoroalkyl group. In a preferred embodiment, $X^A$ is not substituted by these groups.

In a preferred embodiment, $X^A$ may each independently be

$R^{52}$ represents a single bond, $-(CH_2)_{t5}-$ or an o-, m-, or p-phenylene group, and is $-(CH_2)_{t5}-$ in one embodiment, and is a single bond in one embodiment. t5 is an integer of 1 to 20, preferably an integer of 2 to 6, and more preferably an integer of 2 to 3. $X^A$ (typically, a hydrogen atom of $X^A$) herein is optionally substituted with one or more substituents selected from a fluorine atom, a $C_{1-3}$ alkyl group, and a $C_{1-3}$ fluoroalkyl group. In a preferred embodiment, $X^A$ is not substituted by these groups.

Preferably, $X^A$ may each independently be
a single bond,
a $C_{1-20}$ alkylene group,
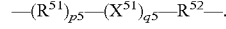, or
$-X^{54}-R^{52}-$,
wherein $R^{51}$ and $R^{52}$ have the same meanings as above, and $X^{53}$ represents
$-O-$,
$-C(O)-$,
$-C(O)O-$,
$-CONR^{54}-$,
$-O-CONR^{54}-$,
$-O-(CH_2)_{u4}-CO-$,
$-O-(CH_2)_{u4}-CONR^{54}-$,
$-Si(R^{53})_2-$,
$-(Si(R^{53})_2O)_{m5}-Si(R^{53})_2-$,
$-O-(CH_2)_{u5}-(Si(R^{53})_2O)_{m5}-Si(R^{53})_2-$,
$-O-(CH_2)_{u5}-Si(R^{53})_2-O-Si(R^{53})_2-CH_2CH_2-Si(R^{53})_2-O-Si(R^{53})_2-$,
$-O-(CH_2)_{u5}-Si(OCH_3)_2OSi(OCH_3)_2-$,
$-CONR^{54}-(CH_2)_{u5}-(Si(R^{53})_2O)_{m5}-Si(R^{53})_2-$,
$-CONR^{54}-(CH_2)_{u5}-N(R^{54})-$, or
$-CONR^{54}-(o-, m- or p-phenylene)-Si(R^{53})_2-$,
wherein $R^{53}$, $R^{54}$ and m5 have the same meanings as above, u4 represents an integer of 1 to 20, preferably an integer of 1 to 6, more preferably an integer of 1 to 3, for example 1; and u5 represents an integer of 1 to 20, preferably an integer of 2 to 6, more preferably an integer of 2 to 3, and $X^{54}$ represents
—S—,
—C(O)—,
—C(O)O—,
—CONR$^{54}$—,
—O—CONR$^{54}$—,
—O—(CH$_2$)$_{u4}$—CO—,
—O—(CH$_2$)$_{u4}$—CONR$^{54}$—,
—CONR$^{54}$—(CH$_2$)$_{u5}$—(Si(R$^{54}$)$_2$O)$_{m5}$—Si(R$^{54}$)$_2$—,
—CONR$^{54}$—(CH$_2$)$_{u5}$—N(R$^{54}$)—, or
—CONR$^{54}$-(o-, m- or p-phenylene)-Si(R$^4$)$_2$—,
wherein each symbol has the same meaning as above.

In a preferred embodiment, $X^A$ may each independently be
a single bond,
a C$_{1-20}$ alkylene group,
—(CH$_2$)$_{s5}$—X$^{53}$—,
—(CH$_2$)$_{s5}$—X$^{53}$—(CH$_2$)$_{t5}$—
—X$^{54}$—, or
—X$^{54}$—(CH$_2$)$_{t5}$—,
wherein
$X^{53}$ is —O—, —C(O)—, —CONR$^{54}$—, —O—CONR$^{54}$—, —O—(CH$_2$)$_{u4}$—CO—, or —O—(CH$_2$)$_{u4}$—CONR$^{54}$—, for example —CONR$^{54}$— or —O—CONR$^{54}$—, for example —O—, —C(O)—, —O—(CH$_2$)$_{u4}$—CO—, or —O—(CH$_2$)$_{u4}$—CONR$^{54}$—,
$R^{54}$ each independently at each occurrence represents a hydrogen atom, a phenyl group or a C$_{1-6}$ alkyl group, and preferably represents a hydrogen atom or a methyl group,
u4 has the same meaning as above,
s5 is an integer of 1 to 20,
$X^{54}$ is —C(O)—, —C(O)O—, —CONR$^{54}$—, or —O—CONR$^{54}$—, and
t5 is an integer of 1 to 20.

In one embodiment, $X^A$ may each independently be a C$_{1-20}$ alkylene group,
—(CH$_2$)$_{s5}$—X$^{53}$—,
—(CH$_2$)$_{s5}$—X$^{53}$—(CH$_2$)$_{t5}$—,
—X$^{54}$— or
—X$^{54}$—(CH$_2$)$_{t5}$—,
wherein
$X^{53}$ is —O—, —C(O)—, —CONR$^{54}$—, —O—CONR$^{54}$—, —O—(CH$_2$)$_{u4}$—CO—, or —O—(CH$_2$)$_{u4}$—CONR$^{54}$—, for example —CONR$^{54}$— or —O—CONR$^{54}$—, for example —O—, —C(O)—, —O—(CH$_2$)$_{u4}$—CO—, or —O—(CH$_2$)$_{u4}$—CONR$^{54}$—,
$R^{54}$ each independently at each occurrence represents a hydrogen atom, a phenyl group or a C$_{1-6}$ alkyl group, and preferably represents a hydrogen atom or a methyl group,
u4 has the same meaning as above,
s5 is an integer of 1 to 20,
$X^{54}$ is —C(O)—, —C(O)O—, —CONR$^{54}$—, or —O—CONR$^{54}$—, and
t5 is an integer of 1 to 20.

In a preferred embodiment, $X^A$ may each independently be
a single bond,
a C$_{1-20}$ alkylene group,
—X$^{53}$—,
—X$^{53}$—(CH$_2$)$_{t5}$—,
—(CH$_2$)$_{s5}$—X$^{53}$—, or
—(CH$_2$)$_{s5}$—X$^{53}$—(CH$_2$)$_{t5}$—
wherein
$X^{53}$ is —O—, —C(O)—, —CONR$^{54}$—, —O—CONR$^{54}$—, —O—(CH$_2$)$_{u4}$—CO—, or —O—(CH$_2$)$_{u4}$—CONR$^{54}$—, for example —CONR$^{54}$— or —O—CONR$^{54}$—, for example —O—, —C(O)—, —O—(CH$_2$)$_{u4}$—CO—, or —O—(CH$_2$)$_{u4}$—CONR$^{54}$—,
$R^{54}$ each independently at each occurrence represents a hydrogen atom, a phenyl group or a C$_{1-6}$ alkyl group, and preferably represents a hydrogen atom or a methyl group,
u4 has the same meaning as above,
s5 is an integer of 1 to 20, and
t5 is an integer of 1 to 20.

In one embodiment, $X^A$ may each independently be a single bond,
—C(O)—,
a C$_{1-20}$ alkylene group,
—CONH—(CH$_2$)$_{t5}$—,
—(CH$_2$)$_{s5}$—O—(CH$_2$)$_{t5}$—,
—(CH$_2$)$_{s5}$—O—(CH$_2$)$_{t5}$—CO—,
—(CH$_2$)$_{s5}$—O—(CH$_2$)$_{t5}$—CO—(CH$_2$)$_{s5}$,
—(CH$_2$)$_{s5}$—O—(CH$_2$)$_{t5}$—CONH—,
—(CH$_2$)$_{s5}$—O—(CH$_2$)$_{t5}$CONH—(CH$_2$)$_{s5}$,
—(CH$_2$)$_{s5}$—(Si(R$^{53}$)$_2$O)$_{m5}$—Si(R$^{53}$)$_2$—(CH$_2$)$_{t5}$—,
—(CH$_2$)$_{s5}$—O—(CH$_2$)$_{u5}$—(Si(R$^{53}$)$_2$O)$_{n5}$—Si(R$^{53}$)$_2$—(CH$_2$)$_{t5}$—, or
—(CH$_2$)$_{s5}$—O—(CH$_2$)$_{t5}$—Si(R$^{53}$)$_2$—(CH$_2$)$_{u5}$—Si(R$^{53}$)$_2$—(C$_v$H$_{2v}$)—,
wherein $R^{53}$, m5, s5, t5, and u5 have the same meanings as above, v is an integer of 1 to 20, preferably an integer of 2 to 6, and more preferably an integer of 2 or 3.

In the formula, —(C$_v$H$_{2v}$)— may be straight or branched and may be, for example, —CH$_2$CH$_2$—, —CH$_2$CH$_2$CH$_2$—, —CH(CH$_3$)—, or —CH(CH$_3$)CH$_2$—.

$X^A$ is each independently optionally substituted with one or more substituents selected from a fluorine atom, a C$_{1-3}$ alkyl group and a C$_{1-3}$ fluoroalkyl group (preferably, C$_{1-3}$ perfluoroalkyl group). In one embodiment, $X^A$ is unsubstituted.

The left side of each formula of $X^A$ is bonded to $R^{F1}$ or $R^{F2}$, and the right side thereof is bonded to $R^{Si}$.

In one embodiment, $X^A$ may each independently be a group that is different from an —O—C$_{1-6}$ alkylene group.

In another embodiment, examples of $X^A$ include the following groups:

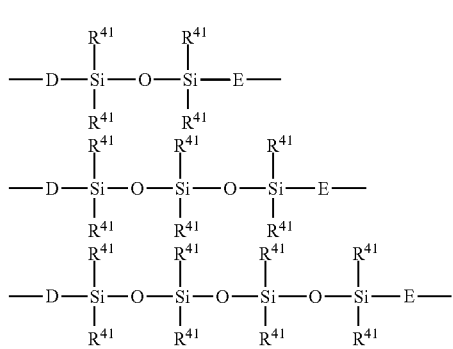

-continued

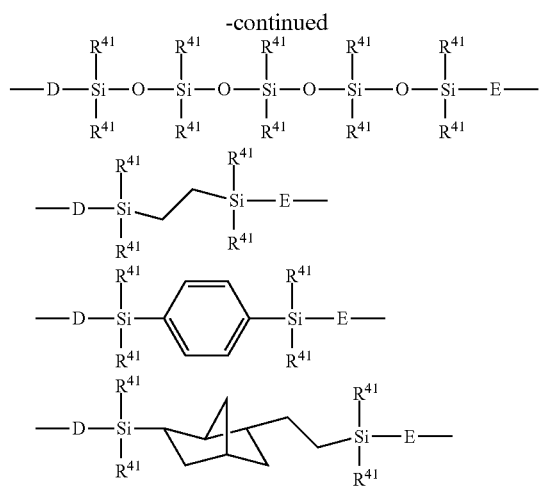

wherein $R^{41}$ each independently represents a hydrogen atom, a phenyl group, an alkyl group having 1 to 6 carbon atoms or a $C_{1-6}$ alkoxy group, and preferably a methyl group; and D is a group selected from
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—,
—$CONH$—$(CH_2)_3$—,
—$CON(CH_3)$—$(CH_2)_3$—, and
—$CON(Ph)$-$(CH_2)_3$— (wherein Ph means phenyl, and the same applies hereinafter) and
a group represented by the following formula:

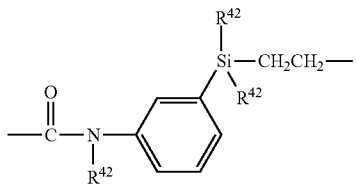

wherein $R^{42}$ each independently represents a hydrogen atom, a $C_{1-6}$ alkyl group or a $C_{1-6}$ alkoxy group, preferably a methyl group or a methoxy group, and more preferably a methyl group,
E is —$(CH_2)_n$— (n represents an integer of 2 to 6); and
D is bonded to the $R^{F1}$ or $R^{F2}$ of the molecular backbone and E is bonded to $R^{Si}$.
Specific examples of $X^4$ include:
a single bond,
—$CH_2OCH_2$—,
—$CH_2O(CH_2)_2$—,
—$CH_2O(CH_2)_3$—,
—$CH_2O(CH_2)_4$—,
—$CH_2O(CH_2)_5$—,
—$CH_2O(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—
—$CH_2OCF_2CHFOCF_2CF_2CF_2$—$C(O)NH$—$CH_2$—,
—$CH_2OCH_2(CH_2)_7CH_2Si(OCH_3)_2OSi(OCH_3)_2(CH_2)_2Si(OCH_3)_2OSi(OCH_3)_2(CH_2)_2$,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—$Si(CH_3)_2$—$(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CH_2O$—$CH_2$—$CO$—,
—$CH_2O$—$CH_2$—$CO$—$CH_2$—,
—$CH_2O$—$CH_2$—$CO$—$(CH_2)_2$—,
—$CO$—,
—$CONH$—,
—$CONH$—$CH_2$—,
—$CONH$—$(CH_2)_2$—,
—$CONH$—$(CH_2)_3$—,
—$CONH$—$(CH_2)_4$—,
—$CONH$—$(CH_2)_5$—,
—$CONH$—$(CH_2)_6$—,
—$CON(CH_3)$—$(CH_2)$—,
—$CON(CH_3)$—$(CH_2)_2$—,
—$CON(CH_3)$—$(CH_2)_3$—,
—$CON(CH_3)$—$(CH_2)_4$—,
—$CON(CH_3)$—$(CH_2)_5$—,
—$CON(CH_3)$—$(CH_2)_6$—,
—$CON(Ph)$-$(CH_2)$—,
—$CON(Ph)$-$(CH_2)_2$—,
—$CON(Ph)$-$(CH_2)_3$—,
—$CON(Ph)$-$(CH_2)_4$—,
—$CON(Ph)$-$(CH_2)_5$—,
—$CON(Ph)$-$(CH_2)_6$—,
—$CONH$—$(CH_2)NH(CH_2)_3$—,
—$CONH$—$(CH_2)_2NH(CH_2)_3$—,
—$CONH$—$(CH_2)_3NH(CH_2)_3$—,
—$CONH$—$(CH_2)_4NH(CH_2)_3$—,
—$CONH$—$(CH_2)_5NH(CH_2)_3$—,
—$CONH$—$(CH_2)_6NH(CH_2)_3$—,
—$CH_2O$—$CH_2$—$CONH$—$CH_2$—,
—$CH_2O$—$CH_2$—$CONH$—$(CH_2)_2$—,
—$CH_2O$—$CONH$—$(CH_2)$—, —CH$_2$O—CONH—(CH$_2$)$_2$—,
—CH$_2$O—CONH—(CH$_2$)$_3$—,
—CH$_2$O—CONH—(CH$_2$)$_4$—,
—CH$_2$O—CONH—(CH$_2$)$_5$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)—,
—C(O)O—(CH$_2$)$_2$—,
—C(O)O—(CH$_2$)$_3$—,
—C(O)O—(CH$_2$)$_4$—,
—C(O)O—(CH$_2$)$_5$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH)$_3$—Si(CH$_3$)$_2$—(CH)$_2$—Si(CH$_3$)$_2$—CH(CH$_3$)—CH$_2$—,
—OCH$_2$—,
—O(CH$_2$)$_2$—,
—O(CH$_2$)$_3$—,
—OCFHCF$_2$—,
and

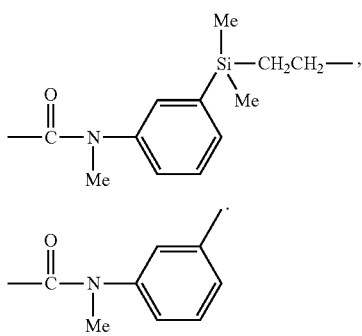

In another embodiment, $X^A$ is each independently a group represented by formula: —(R$^{16}$)$_{x1}$—(CFR$^{17}$)$_{x2}$—(CH$_2$)$_{x3}$—. In the formula, x1, x2, and x3 are each independently an integer of 0 to 10, the sum of x1, x2, and x3 is 1 or more, and the occurrence order of the respective repeating units in parentheses is not limited in the formula.

In the formula, R$^{16}$ is each independently at each occurrence an oxygen atom, phenylene, carbazolylene, —NR$^{18}$— (wherein R$^{18}$ represents a hydrogen atom or an organic group), or a divalent organic group. Preferably, R$^{16}$ represents an oxygen atom or a divalent polar group.

Examples of the "divalent polar group" include, but are not limited to, —C(O)—, —C(=NR$^{19}$)— and —C(O)NR$^{19}$— (wherein R$^{19}$ represents a hydrogen atom or a lower alkyl group). The "lower alkyl group" is, for example, an alkyl group having 1 to 6 carbon atoms, such as methyl, ethyl, and n-propyl, which is optionally substituted with one or more fluorine atoms.

In the formulae, R$^{17}$ is each independently at each occurrence a hydrogen atom, a fluorine atom, or a lower fluoroalkyl group, and is preferably a fluorine atom. The "lower fluoroalkyl group" is, for example, a fluoroalkyl group having 1 to 6 carbon atoms and preferably 1 to 3 carbon atoms, preferably a perfluoroalkyl group having 1 to 3 carbon atoms, more preferably a trifluoromethyl group or pentafluoroethyl group, and still more preferably a trifluoromethyl group.

In the formulae (1) and (2), R$^{Si}$ is each independently at each occurrence a group having a Si atom bonded to a hydrolyzable group.

(Fluoropolyether Group-Containing Silane Compound (A))

The fluoropolyether-containing silane compound (A) is a compound represented by formula (1) or (2),
wherein R$^{F1}$ is Rf$^1$—R$^F$—O$_q$—;
R$^{F2}$ is —Rf$^2_p$—R$^F$—O$_q$—;
R$^F$ is a fluoropolyether group represented by R$^{F1}$; and
R$^{Si}$ is each independently at each occurrence represented by the following formula (S11) or (S12):

$$-C(Z^1-SiR^{21}_{p1}R^{22}_{q1})_3 \quad (S11)$$

$$-Si(Z^1-SiR^{21}_{p1}R^{22}_{q1})_3 \quad (S12)$$

For example, the fluoropolyether-containing silane compound (A) is a compound represented by the following formula (A1), (A2), (A3), or (A4):

$$R^{F1}_\alpha-X^A(C(Z^1-SiR^{21}_{p1}R^{22}_{q1})_3)_\beta \quad (A1)$$

$$((R^{22}_{q1}R^{21}_{p1}Si-Z^1)_3C)_\gamma X^A-R^{F2}-X^A(C(Z^1-SiR^{21}_{p1}R^{22}_{q1})_3)_\gamma \quad (A2)$$

$$R^{F1}_\alpha-X^A(Si(Z^1-SiR^{21}_{p1}R^{22}_{q1})_3)_\beta \quad (A3)$$

$$((R^{22}_{q1}R^{21}_{p1}Si-Z_1)_3Si)_\gamma X^A-R^{F2}-X^A(Si(Z^1-SiR^{21}_{p1}R^{22}_{q1})_3)_\gamma \quad (A4)$$

Hereinafter, unless otherwise specified, the description of the formula (1) or (2) can be applied to formulae (A1), (A2), (A3), and (A4). Specifically, R$^{f1}$, R$^{f2}$, p, q, X$^A$, α, β, and γ have the same meaning as above.

In the fluoropolyether group-containing silane compound (A), R$^{F11}$ is a fluoropolyether group represented by formula:

—(OC$_6$F$_{12}$)$_a$—(OC$_5$F$_{10}$)$_b$—(OC$_4$F$_8$)$_c$—(OC$_3$R$^{Fa}_6$)$_d$—(OC$_2$F$_4$)$_e$—(OCF$_2$)$_f$—

In the formula:
R$^{Fa}$ is each independently at each occurrence a hydrogen atom, a fluorine atom, or a chlorine atom, and
a, b, c, d, e and f are each independently an integer of 0 to 200, the sum of a, b, c, d, e and f is 1 or more, and the occurrence order of the respective repeating units in parentheses with a, b, c, d, e or f is not limited in the formula.

R$^{Fa}$ is preferably a hydrogen atom or a fluorine atom, and more preferably a fluorine atom.

Preferably, a, b, c, d, e, and f are each independently an integer of 0 to 100.

The sum of a, b, c, d, e, and f is preferably 5 or more, and more preferably 10 or more, and may be, for example, 15 or more or 20 or more. The sum of a, b, c, d, e, and f is preferably 200 or less, more preferably 100 or less, and still more preferably 60 or less, and may be, for example, 50 or less or 30 or less.

These repeating units may be linear or branched, and are preferably linear. For example, $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like, and is preferably $-(OCF_2CF_2CF_2CF_2CF_2CF_2)-$. $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$, or the like, and is preferably $-(OCF_2CF_2CF_2CF_2CF_2)-$. $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$, and is preferably $-(OCF_2CF_2CF_2CF_2)-$. $-(OC_3F_6)-$ (that is, in the formula, $R^{Fa}$ is a fluorine atom) may be any of $-(OCF_2CF_2CF_2)-$, $-(OCF(CF_3)CF_2)-$, and $-(OCF_2CF(CF_3))-$, and is preferably $-(OCF_2CF_2CF_2)-$. $-(OC_2F_4)-$ may be any of $-(OCF_2CF_2)-$ and $-(OCF(CF_3))-$, and is preferably $-(OCF_2CF_2)-$.

In one embodiment, $R^{F11}$ is each independently at each occurrence a group represented by the following formula (f1), (f2), (f3), (f4), or (f5):

$$-(OC_3F_6)_d-\qquad(f1)$$

wherein d is an integer of 1 to 200;

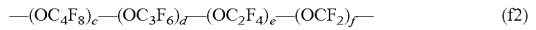

$$-(OC_4F_8)_c-(OC_3F_6)_d-(OC_2F_4)_e-(OCF_2)_f-\qquad(f2)$$

wherein c and d are each independently an integer of 0 or more and 30 or less, and e and f are each independently an integer of 1 or more and 200 or less;
the sum of c, d, e, and f is 2 or more; and
the occurrence order of the respective repeating units in parentheses with the subscript c, d, e, or f is not limited in the formula;

$$-(R^6-R^7)_g-\qquad(f3)$$

wherein $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or a combination of two or three groups independently selected from these groups; and
g is an integer of 2 to 100;

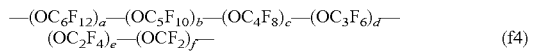

$$-(OC_6F_{12})_a-(OC_5F_{10})_b-(OC_4F_8)_c-(OC_3F_6)_d-\\(OC_2F_4)_e-(OCF_2)_f-\qquad(f4)$$

wherein e is an integer of 1 or more and 200 or less, a, b, c, d, and f are each independently an integer of 0 or more and 200 or less, the sum of a, b, c, d, e, and f is at least 1, and the occurrence order of the respective repeating units in parentheses with a, b, c, d, e, or f is not limited in the formula; and

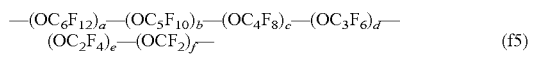

$$-(OC_6F_{12})_a-(OC_5F_{10})_b-(OC_4F_8)_c-(OC_3F_6)_d-\\(OC_2F_4)_e-(OCF_2)_f-\qquad(f5)$$

wherein f is an integer of 1 or more and 200 or less, a, b, c, d, and e are each independently an integer of 0 or more and 200 or less, the sum of a, b, c, d, e, and f is at least 1, and the occurrence order of the respective repeating units in parentheses with a, b, c, d, e, or f is not limited in the formula.

In the formula (f1), d is preferably 5 to 200, more preferably 10 to 100, and still more preferably 15 to 50, and is, for example, an integer of 25 to 35. The formula (f1) is preferably a group represented by $-(OCF_2CF_2CF_2)_d-$ or $-(OCF(CF_3)CF_2)_d-$, and more preferably a group represented by $-(OCF_2CF_2CF_2)_d-$.

In the formula (f2), e and f are each independently an integer of preferably 5 or more and 200 or less, and more preferably 10 to 200. The sum of c, d, e, and f is preferably 5 or more, and more preferably 10 or more, and may be, for example, 15 or more or 20 or more. In one embodiment, the formula (f2) is preferably a group represented by $-(OCF_2CF_2CF_2CF_2)_c-(OCF_2CF_2CF_2)_d-(OCF_2CF_2)_e-(OCF_2)_f-$. In another embodiment, formula (f2) may be a group represented by $-(OC_2F_4)_e-(OCF_2)_f-$.

In the formula (f3), $R^6$ is preferably $OC_2F_4$. In the formula (f3), $R^7$ is preferably a group selected from $OC_2F_4$, $OC_3F_6$, and $OC_4F_8$, or a combination of two or three groups independently selected from these groups, and more preferably a group selected from $OC_3F_6$ and $OC_4F_8$. Examples of the combination of two or three groups independently selected from $OC_2F_4$, $OC_3F_6$, and $OC_4F_8$ include, but are not limited to, $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_4F_8-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4OC_3F_6OC_3F_6-$, $-OC_2F_4OC_4F_8OC_2F_4-$, $-OC_3F_6OC_2F_4OC_2F_4-$, $-OC_3F_6OC_2F_4OC_3F_6-$, $-OC_3F_6OC_3F_6OC_2F_4-$, and $-OC_4F_8OC_2F_4OC_2F_4-$. In the formula (f3), g is an integer of preferably 3 or more, and more preferably 5 or more. g is preferably an integer of 50 or less. In the formula (f3), $OC_2F_4$, $OC_3F_6$, $OC_4F_8$, $OC_5F_{10}$, and $OC_6F_{12}$ may be either linear or branched, and are preferably linear. In this embodiment, the formula (f3) is preferably $-(OC_2F_4-OC_3F_6)_g-$ or $-(OC_2F_4-OC_4F_8)_g-$.

In the formula (f4), e is an integer of preferably 1 or more and 100 or less, and more preferably 5 or more and 100 or less. The sum of a, b, c, d, e, and f is preferably 5 or more, and more preferably 10 or more, and is, for example, 10 or more and 100 or less.

In the formula (f5), f is an integer of preferably 1 or more and 100 or less, and more preferably 5 or more and 100 or less. The sum of a, b, c, d, e, and f is preferably 5 or more, and more preferably 10 or more, and is, for example, 10 or more and 100 or less.

In $R^{F11}$, the ratio of e to f (hereinafter, referred to as an "e/f ratio") is 0.1 to 10, preferably 0.2 to 5, more preferably 0.2 to 2, still more preferably 0.2 to 1.5. With an e/f ratio of 10 or less, the lubricity, friction durability, and chemical resistance (such as durability against (human) sweat) of a surface-treating layer obtained from the compound are further increased.

The smaller the e/f ratio is, the higher the lubricity and the friction durability of the surface-treating layer are. On the other hand, with an e/f ratio of 0.1 or more, the stability of the compound can be further increased. The larger the e/f ratio is, the more improved the stability of the compound is.

In one embodiment, the e/f ratio is preferably 0.2 to 0.9, more preferably 0.2 to 0.85, and still more preferably 0.2 to 0.8.

In one embodiment, from the viewpoint of heat resistance, the above e/f ratio is preferably 0.9 or more, and more preferably 0.9 to 1.5.

In the fluoropolyether group-containing silane compound (A), the number-average molecular weights of the $R^{F1}$ and $R^{F2}$ moieties are not limited, and are each, for example, 500 to 30,000, preferably 1,500 to 30,000, and more preferably 2,000 to 10,000. Herein, the number-average molecular weights of $R^{F1}$ and $R^{F2}$ are each defined as a value obtained by $^{19}$F-NMR measurement.

In another embodiment, in the fluoropolyether group-containing silane compound (A), the number-average molecular weights of the $R^{F1}$ and $R^{F2}$ moieties are each 500 to 30,000, preferably 1,000 to 20,000, more preferably 2,000 to 15,000, and still more preferably 2,000 to 10,000, and may be, for example, 3,000 to 8,000.

In the fluoropolyether-containing silane compound (A), $R^{Si}$ is each independently at each occurrence represented by the following formula (S11) or (S12).

$$—C(Z^1—SiR^{21}_{p1}R^{22}_{q1})_3 \quad (S11)$$

$$—Si(Z^1—SiR^{21}_{p1}R^{22}_{q1})_3 \quad (S12)$$

In one embodiment, in the fluoropolyether-containing silane compound (A), $R^{Si}$ is a group represented by formula (S11).

In one embodiment, in the fluoropolyether-containing silane compound (A), $R^{Si}$ is a group represented by formula (S12).

In the formulae (S11) and (S12), $Z^1$ is each independently at each occurrence a divalent organic group.

The right side of the structure described below as $Z^1$ is bonded to $(SiR^{21}_{p1}R^{22}_{q1})$.

$Z^1$ is preferably a divalent organic group.

In a preferred embodiment, $Z^1$ does not encompass any group that forms a siloxane bond with the Si atom to which $Z^1$ is bonded.

The divalent organic group in $Z^1$ is preferably a $C_{1-6}$ alkylene group, $—(CH_2)_{z1}—O—(CH_2)_{z2}—$ (in the formula, z1 is an integer of 0 to 6, for example, an integer of 1 to 6, z2 is an integer of 0 to 6, for example, an integer of 1 to 6, and the sum of z1 and z2 is preferably 1 or more), or $—(CH_2)_{z3}$-phenylene-$(CH_2)_{z4}—$ (in the formula, z3 is an integer of 0 to 6, for example, an integer of 1 to 6, z4 is an integer of 0 to 6, for example, an integer of 1 to 6, and the sum of z3 and z4 is preferably 1 or more). Such a $C_{1-6}$ alkylene group may be straight or branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, but are preferably unsubstituted.

In a preferred embodiment, $Z^1$ is a $C_{1-6}$ alkylene group or $—(CH_2)_{z3}$-phenylene-$(CH_2)_{z4}—$, and preferably-phenylene-$(CH_2)_{z4}—$. When $Z^1$ is such a group, light resistance, in particular ultraviolet resistance, can be further enhanced. Preferably, z3 is an integer of 0 to 6 and z4 is an integer of 1 to 6.

In another preferred embodiment, $Z^1$ is a $C_{1-3}$ alkylene group. In one embodiment, $Z^1$ may be $—CH_2CH_2CH_2—$. In another embodiment, $Z^1$ may be $—CH_2CH_2—$.

In one embodiment, $Z^1$ may be a structure represented by $O—Z^2$. $Z^2$ is a divalent organic group. The right side of $O—Z^2$ is bonded to $(SiR^{21}_{p1}R^{22}_{q1})$.

In the above embodiments, $Z^2$ may have a silicon atom and/or a siloxane bond.

In one embodiment, $Z^2$ may have a structure described as $Z^1$.

In one embodiment, $Z^2$ is an alkylene group having 2 to 10 carbon atoms such as an ethylene group, a propylene group (a trimethylene group, a methylethylene group), a butylene group (a tetramethylene group, a methylpropylene group), or a hexamethylene group, an alkylene group having 2 to 8 carbon atoms containing an arylene group having 6 to 8 carbon atoms such as a phenylene group (e.g., an alkylene-arylene group having 8 to 16 carbon atoms), an alkylene group having 2 to 6 carbon atoms containing a diorganosylylene group such as a dimethylsilylene group or a diethylsilylene group, a divalent group in which alkylene groups having 2 to 8 carbon atoms bind to each other via a silalkylene structure having 1 to 4 carbon atoms or a silarylene structure having 6 to 10 carbon atoms, an alkylene group having 2 to 6 carbon atoms containing a linear, branched or cyclic divalent organopolysiloxane residue having 2 to 10 and preferably 2 to 5 silicon atoms, and a divalent group in which an alkylene group having 2 to 10 carbon atoms binds to a bond of a linear, branched or cyclic divalent organopolysiloxane residue having 2 to 10 and preferably 2 to 5 silicon atoms; an alkylene group having 3 to 10 carbon atoms, an alkylene group having 2 to 6 carbon atoms containing a phenylene group, an alkylene group having 2 to 6 carbon atoms containing a dimethylsilylene group, a divalent group in which alkylene groups having 2 to 4 carbon atoms bind to each other via a silalkylene structure having 1 to 4 carbon atoms or a silarylene structure having 6 to 10 carbon atoms, an alkylene group having 2 to 6 carbon atoms containing a linear divalent organopolysiloxane residue having 2 to 10 silicon atoms, and a divalent group in which an alkylene group having 2 to 10 carbon atoms binds to a bond of a divalent organopolysiloxane residue that is linear and has 2 to 10 silicon atoms or that is branched or cyclic and has 3 to 10 silicon atoms are preferable; and an alkylene group having 3 to 6 carbon atoms is more preferable.

Specific examples of $Z^2$ include, for example, the following groups:

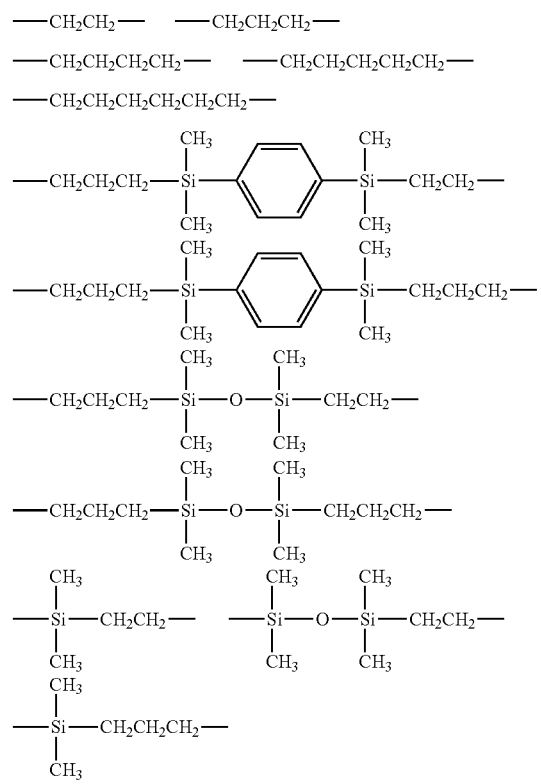

In formulae (S11) and (S12), $R^{21}$ is each independently at each occurrence a hydroxyl group or a hydrolyzable group, preferably a hydrolyzable group.

In formulae (S11) and (S12), $R^{22}$ is each independently at each occurrence a hydrogen atom or a monovalent organic group. Such a monovalent organic group is a monovalent organic group excluding the above hydrolyzable group.

In $R^{22}$, the monovalent organic group is preferably a $C_{1-20}$ alkyl group, more preferably a $C_{1-6}$ alkyl group, and still more preferably a methyl group.

In formulae (S11) and (S12), p1 is each independently at each occurrence an integer of 1 to 3, and q1 is each independently at each occurrence an integer of 0 to 2. In the unit of $(SiR^{21}_{p1}R^{22}_{q1})$, the sum of p1 and q1 is 3.

p1 is preferably 2 or 3, and still more preferably 3. That is, in each $(Z^1—SiR^{21}_{p1}R^{22}_{q1})$, there is at least one $R^{21}$.

In one embodiment, the fluoropolyether-containing silane compound (A) is represented by formula (1).

In one embodiment, the fluoropolyether-containing silane compound (A) is represented by formula (2).

(Fluoropolyether Group-Containing Silane Compound (B))

The fluoropolyether-containing silane compound (B) is a compound represented by formula (1) or (2):

wherein $R^{F1}$ is $Rf^1—R^F—O_q—$;
$R^{F2}$ is $—Rf^2_p—R^F—O_q—$;
$R^F$ is a fluoropolyether group represented by $R^{F21}$; and
$R^{Si}$ is each independently at each occurrence represented by the following formula (S2), (S3), or (S4):

  (S2)

  (S3)

  (S4)

For example, the fluoropolyether group-containing silane compound (B) is represented by the following formula (B11), (B21), (B12), (B22), (B13), or (B23).

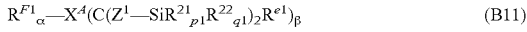  (B11)

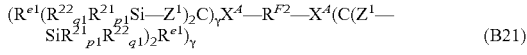  (B21)

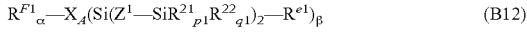  (B12)

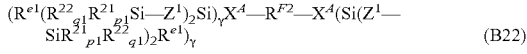  (B22)

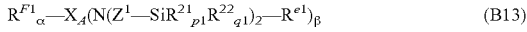  (B13)

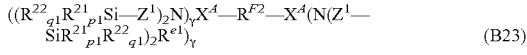  (B23)

Hereinafter, unless otherwise specified, the description of the formula (1) or (2) thereof can be applied to formulae (B11), (B21), (B12), (B22), (B13), and (B23). Specifically, $R^{f1}$, $R^{f2}$, p, q, $X^A$, α, β, and γ have the same meaning as above.

In the fluoropolyether group-containing silane compound (B), $R^{F21}$ is a fluoropolyether group represented by formula:

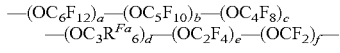

In the formula, a, b, c, d, e, f, and $R^{Fa}$ have the same meaning as the symbols in the formulae (S11) and (S12).

In the formula, the structure of each of the repeating units in $R^{F21}$ is same as the structure of each of the repeating units in $R^{F11}$. Here, "the structure of each of the repeating units is same" means that each of the repeating units in $R^{F11}$ and the each of repeating units in $R^{F21}$ have the same structure, and the combination of the repeating units in $R^{F11}$ and the combination of the repeating units in $R^{F21}$ are the same. a in $R^{F11}$ may be the same as a in $R^{F21}$ or different from a in $R^{F21}$; b in $R^{F11}$ may be the same as b in $R^{F21}$ or different from b in $R^{F21}$; c in $R^{F11}$ may be the same as c in $R^{F21}$ or different from c in $R^{F21}$; d in $R^{F1}$ may be the same as d in $R^{F21}$ or different from d in $R^{F21}$; e in $R^{F11}$ may be the same as e in $R^{F21}$ or different from e in $R^{F21}$; and f in $R^{F11}$ may be the same as f in $R^{F21}$ or different from f in $R^{F21}$.

The structure of each of the repeating units in $R^{F21}$ is the same as the structure of each of the repeating units in $R^{F11}$, which is explained in detail below.

The repeating unit $—(OC_6F_{12})—$ in $R^{F21}$ has the same structure as the repeating unit $—(OC_6F_{12})—$ in $R^{F11}$. The repeating unit $—(OC_5F_{10})—$ in $R^{F21}$ has the same structure as the repeating unit $—(OC_5F_{10})—$ in $R^{F11}$. The repeating unit $—(OC_4F_8)—$ in $R^{F21}$ has the same structure as the repeating unit $—(OC_4F_8)—$ in $R^{F11}$. The repeating unit $—(OC_3F_6)—$ in $R^{F21}$ has the same structure as the repeating unit $—(OC_3F_6)—$ in $R^{F11}$. The repeating unit $—(OC_2F_4)—$ in $R^{F21}$ has the same structure as the repeating unit $—(OC_2F_4)—$ in $R^{F11}$.

For example, when the repeating unit $—(OC_3F_6)—$ in $R^{F11}$ is represented by $—(OCF_2CF_2CF_2)—$, the repeating unit $—(OC_3F_6)—$ in $R^{F21}$ is represented by $—(OCF_2CF_2CF_2)—$; when the repeating unit $—(OC_3F_6)—$ in $R^{F11}$ is represented by $—(OCF(CF_3)CF_2)—$, the repeating unit $—(OC_3F_6)—$ in $R^{F21}$ is represented by $—(OCF(CF_3)CF_2)—$; and when the repeating unit $—(OC_3F_6)—$ in $R^{F11}$ is represented by $—(OCF_2CF(CF_3))—$, the repeating unit $—(OC_3F_6)—$ in $R^{F21}$ is represented by $—(OCF_2CF(CF_3))—$. When the repeating unit $—(OC_2F_4)—$ in $R^{F11}$ is represented by $—(OCF_2CF_2)—$, the repeating unit $—(OC_2F_4)—$ in $R^{F21}$ is represented by $—(OCF_2CF_2)—$; and when the repeating unit $—(OC_2F_4)—$ in $R^{F11}$ is represented by $—(OCF(CF_3))—$, the repeating unit $—(OC_2F_4)—$ in $R^{F21}$ is represented by $—(OCF(CF_3))—$.

The combination of repeating units in $R^{F11}$ is the same as the combination of repeating units in $R^{F21}$, which is explained in detail below.

For example, when $R^{F11}$ has the repeating unit $—(OC_3F_6)—$, $R^{F21}$ has the repeating unit $—(OC_3F_6)—$; when $R^{F11}$ has the repeating units $—(OC_3F_6)—$ and $—(OC_2F_4)—$, $R^{F21}$ has the repeating units $—(OC_3F_6)—$ and $—(OC_2F_4)—$; and when $R^{F11}$ has the repeating units $—(OC_2F_4)—$ and $—(OCF_2)—$, $R^{F21}$ has the repeating units $—(OC_2F_4)—$ and $—(OCF_2)—$.

Preferably, each values of a, b, c, d, e, and f in $R^{F11}$ are same as each values of a, b, c, d, e, and f in $R^{F21}$, respectively. Here, "each values of a, b, c, d, e, and f are the same" means that the ratio of the value in $R^{F11}$ to the value in $R^{F21}$, that is, "the value in $R^{F21}$"/"the value in $R^{F11}$" is between 0.9 and 1.1, specifically, between 0.95 and 1.05. The above "the value in $R^{F21}$"/"the value in $R^{F11}$" specifically means "the value of a in $R^{F21}$"/"the value of a in $R^{F11}$", "the value of b in $R^{F21}$"/"the value of b in $R^{F11}$", "the value of c in $R^{F21}$"/"the value of c in $R^{F11}$", "the value of d in $R^{F21}$"/"the value of d in $R^{F11}$", "the value of e in $R^{F21}$"/"the value of e in $R^{F11}$", and "the value of f in $R^{F21}$"/"the value of f in $R^{F11}$".

Preferably, when $R^{F11}$ is each independently at each occurrence represented by formula (f1), $R^{F21}$ is represented by formula (f1'); when $R^{F11}$ is represented by formula (f2), $R^{F21}$ is represented by formula (f2'); when $R^{F11}$ is represented by formula (f3), $R^{F21}$ is represented by formula (f3'); when $R^{F11}$ is represented by formula (f4), $R^{F21}$ is represented by formula (f4'); and when $R^{F11}$ is represented by formula (f4), $R^{F21}$ is represented by formula (f5'). When $R^{F21}$ is represented by the following formula (f1'), (f2'), (f3'), (f4'), or (f5'), each repeating unit is a repeating unit of the same type as the repeating unit of formula (f1), (f2), (f3), (f4), or (f5):

$$—(OC_3F_6)_d—\quad(f1')$$

wherein d is an integer of 1 to 200;

$$—(OC_4F_8)_c—(OC_3F_6)_d—(OC_2F_4)_e—(OCF_2)_f—\quad(f2')$$

wherein c and d are each independently an integer of 0 or more and 30 or less, and e and f are each independently an integer of 1 or more and 200 or less;
the sum of c, d, e, and f is 2 or more; and
the occurrence order of the respective repeating units in parentheses with the subscript c, d, e, or f is not limited in the formula;

$$—(R^6—R^7)_g—\quad(f3')$$

wherein $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or a combination of two or three groups independently selected from these groups; and
g is an integer of 2 to 100;

$$—(OC_6F_{12})_a—(OC_5F_{10})_b—(OC_4F_8)_c—(OC_3F_6)_d—\\(OC_2F_4)_e—(OCF_2)_f—\quad(f4')$$

wherein e is an integer of 1 or more and 200 or less, a, b, c, d, and f are each independently an integer of 0 or more and 200 or less, the sum of a, b, c, d, e, and f is at least 1, and the occurrence order of the respective repeating units in parentheses with a, b, c, d, e, or f is not limited in the formula; and $$—(OC_6F_{12})_a—(OC_5F_{10})_b—(OC_4F_8)_c—(OC_3F_6)_d—\\(OC_2F_4)_e—(OCF_2)_f—\quad(f5')$$

wherein f is an integer of 1 or more and 200 or less, a, b, c, d, and e are each independently an integer of 0 or more and 200 or less, the sum of a, b, c, d, e, and f is at least 1, and the occurrence order of the respective repeating units in parentheses with a, b, c, d, e, or f is not limited in the formula.

In $R^{F21}$, the e/f ratio is 0.1 to 10, preferably 0.2 to 5, more preferably 0.2 to 2, and still more preferably 0.2 to 1.5.

In one embodiment, the e/f ratio of $R^{F21}$ is preferably 0.2 to 0.9, more preferably 0.2 to 0.85, and still more preferably 0.2 to 0.8.

In one embodiment, from the viewpoint of heat resistance, the e/f ratio of $R^{F21}$ is preferably 0.9 or more, and more preferably 0.9 to 1.5.

In one embodiment, the e/f ratio in $R^{F21}$ is the same as the e/f ratio in $R^{F11}$. Here, having the same e/f ratio means that the ratio of the e/f ratio of $R^{F21}$ to the e/f ratio of $R^{F11}$, that is, "the e/f ratio of $R^{F21}$"/"the e/f ratio of $R^{F11}$" is 0.9 to 1.1, specifically, 0.95 to 1.05.

In one embodiment, the e/f ratio in $R^{F21}$ is different from the e/f ratio in $R^{F11}$. Here, having different e/f ratio means that the ratio of the e/f ratio of $R^{F21}$ to the e/f ratio of $R^{F11}$, that is, "the e/f ratio of $R^{F21}$"/"the e/f ratio of $R^{F11}$" is less than 0.9 or more than 1.1, for example, 0.87 or less, 0.86 or less, 1.3 or more, or 1.5 or more.

In one embodiment, the e/f ratio of $R^{F11}$ and $R^{F21}$ is preferably 0.2 to 0.9, more preferably 0.2 to 0.85, and still more preferably 0.2 to 0.8.

In one embodiment, from the viewpoint of heat resistance, the e/f ratio of $R^{F11}$ and $R^{F21}$ is preferably 0.9 or more, and more preferably 0.9 to 1.5.

In the fluoropolyether group-containing silane compound (B), the number-average molecular weights of the $R^{F1}$ and $R^{F2}$ moieties are not limited, and are each, for example, 500 to 30,000, preferably 1,500 to 30,000, and more preferably 2,000 to 10,000. Herein, the number-average molecular weights of $R^{F1}$ and $R^{F2}$ are each defined as a value obtained by $^{19}$F-NMR measurement.

In another embodiment, in the fluoropolyether group-containing silane compound (B), the number-average molecular weights of the $R^{F1}$ and $R^{F2}$ moieties are each 500 to 30,000, preferably 1,000 to 20,000, more preferably 2,000 to 15,000, and still more preferably 2,000 to 10,000, and may be, for example, 3,000 to 8,000.

The number-average molecular weight of $R^{F21}$ is preferably the same as the number-average molecular weight of $R^{F11}$. Here, having the same number-average molecular weight means that the ratio of the number-average molecular weight of $R^{F21}$ to the number-average molecular weight of $R^{F11}$, that is, "the number-average molecular weight of $R^{F21}$"/"the number-average molecular weight of $R^{F11}$" is 0.9 to 1.1, specifically, 0.95 to 1.05.

In one embodiment, the number-average molecular weight of $R^{F21}$ is different value from the number-average molecular weight of $R^{F11}$. For example, the ratio of the number-average molecular weight of $R^{F21}$ to the number-average molecular weight of $R^{F11}$, that is, "the number-average molecular weight of $R^{F21}$"/"the number-average molecular weight of $R^{F11}$" may be less than 0.9 or more than 1.1.

The number-average molecular weight of $R^{F1}$ in the fluoropolyether-containing silane compound (B) is preferably the same as the number-average molecular weight of $R^{F1}$ in the fluoropolyether-containing silane compound (A); and the number-average molecular weight of $R^{F2}$ in the fluoropolyether-containing silane compound (B) is preferably the same as the number-average molecular weight of $R^{F2}$ in the fluoropolyether-containing silane compound (A). Here, having the same number-average molecular weight means that the ratio of the number-average molecular weight of the fluoropolyether-containing silane compound (B) to the number-average molecular weight of the fluoropolyether-containing silane compound (A), that is, "number-average molecular weight of fluoropolyether-containing silane compound (B)"/"number-average molecular weight of fluoropolyether-containing silane compound (A)", is 0.9 and 1.1, specifically 0.95 and 1.05.

In another embodiment, the number-average molecular weights of $R^{F1}$ and $R^{F2}$ in the fluoropolyether-containing silane compounds (A) and (B) are preferably in the range of 500 to 30,000, more preferably in the range of 1,500 to 30,000, and still more preferably in the range of 2,000 to 10,000.

In one embodiment, in the fluoropolyether group-containing silane compounds (A) and (B), the number-average molecular weights of the $R^{F1}$ and $R^{F2}$ moieties are each 500 to 30,000, preferably 1,000 to 20,000, more preferably 2,000 to 15,000, and still more preferably 2,000 to 10,000, and may be, for example, 3,000 to 8,000.

Preferably,
the number-average molecular weight of $R^{F21}$ in the fluoropolyether group-containing silane compound (B) is same as the number-average molecular weight of $R^{F11}$ in the fluoropolyether group-containing silane compound (A); and
the e/f value in the fluoropolyether group-containing silane compound (B) is the same as the e/f value in the fluoropolyether group-containing silane compound (A).

In one embodiment,
$R^{F11}$ is each independently at each occurrence represented by the following formula (f1), (f2), (f3), (f4), or (f5);

when $R^{F11}$ is represented by formula (f1), $R^{F21}$ is represented by formula (f1');
when $R^{F11}$ is represented by formula (f2), $R^{F21}$ is represented by formula (f2');
when $R^{F11}$ is represented by formula (f3), $R^{F21}$ is represented by formula (f3');
when $R^{F11}$ is represented by formula (f4), $R^{F21}$ is represented by formula (f4');
when $R^{F11}$ is represented by formula (f5), $R^{F21}$ is represented by formula (f5');
the number-average molecular weight of $R^{F21}$ in the fluoropolyether group-containing silane compound (B) is same as the number-average molecular weight of $R^{F11}$ in the fluoropolyether group-containing silane compound (A); and
the e/f value in the fluoropolyether group-containing silane compound (B) is the same as the e/f value in the fluoropolyether group-containing silane compound (A).

In one embodiment,
$R^{F11}$ is each independently at each occurrence represented by the following formula (f1), (f2), (f3), (f4), or (f5);
when $R^{F11}$ is represented by formula (f1), $R^{F21}$ is represented by formula (f1');
when $R^{F11}$ is represented by formula (f2), $R^{F21}$ is represented by formula (f2');
when $R^{F11}$ is represented by formula (f3), $R^{F21}$ is represented by formula (f3');
when $R^{F11}$ is represented by formula (f4), $R^{F21}$ is represented by formula (f4');
when $R^{F11}$ is represented by formula (f5), $R^{F21}$ is represented by formula (f5'); and
the e/f value in the fluoropolyether group-containing silane compound (B) is different from the e/f value in the fluoropolyether group-containing silane compound (A).

$Z^1$, $R^{21}$, $R^{22}$, p1, and q1 in formulae (S2), (S3), and (S4) have the same meaning as $Z^1$, $R^{21}$, $R^{22}$, p1, and q1 in formulae (S11) and (S12), respectively.

In formula (S1), $R^{e1}$ is each independently a hydrogen atom, a hydroxyl group, or a monovalent organic group.

$R^{e1}$ is a structure excluding a group represented by ($Z^1$—$SiR^{21}_{p1}R^{22}_{q1}$).

In one embodiment, $R^{e1}$ is a hydroxyl group.
In one embodiment, $R^{e1}$ is a monovalent organic group.
In $R^{e1}$, the monovalent organic group is preferably a $C_{1-20}$ alkyl group, more preferably a $C_{1-6}$ alkyl group, and still more preferably a methyl group.

By using the fluoropolyether-containing silane compound (B) having such a structure, steric hindrance can be reduced when it is used to bond to a base material. On the other hand, in the fluoropolyether-containing silane compound (A) described above, steric hindrance can be increased when it is used to bond to the base material. This means that the combination of the fluoropolyether-containing silane compounds (A) and (B) can provide particularly good bonding with the base material and form tight-lattice siloxane three-dimensional crosslinks.

In one embodiment, $R^{e1}$ is a monovalent organic group and has a structure excluding a group represented by —O—($SiR^{21}_{p1}R^{22}_{q1}$).

In one embodiment, $R^{e1}$ is —O—($SiR^{21}_{p1}R^{22}_{q1}$).

In one embodiment, $X^A$ is a single bond; and $R^{e1}$ is a monovalent organic group and is a group represented by —($OR^{n1}$)$_{n11}OR^{n2}$. $R^{n1}$ is a $C_2$-$C_4$ alkylene group, which may be straight or branched. $R^{n1}$ is, for example, an ethylene group. n11 is an integer of 1 to 10, for example, 2. $R^{n2}$ is hydrogen or a $C_1$-$C_4$ alkyl group, for example, a methyl group. In the present embodiment, $R^{e1}$ may include, for example, —($OCH_2CH_2$)$_{n11}OCH_3$, —($OCH_2CH(CH_3)$)$_{n11}OCH_3$, —($OCH_2CH_2CH_2CH_2$)$_{n11}OCH_3$.

In one embodiment, in the fluoropolyether-containing silane compound (B), $R^{Si}$ is a group represented by formula (S2).

In one embodiment, in the fluoropolyether-containing silane compound (B), $R^{Si}$ is a group represented by formula (S3).

In one embodiment, in the fluoropolyether-containing silane compound (B), $R^{Si}$ is a group represented by formula (S4).

In one embodiment, the fluoropolyether-containing silane compound (B) is represented by formula (1).

In one embodiment, the fluoropolyether-containing silane compound (B) is represented by formula (2).

In the surface-treating agent of the present disclosure, a case is excluded, where $R^{Si}$ in the fluoropolyether group-containing silane compound (A) is represented by formula (S12) and $R^{Si}$ in the fluoropolyether group-containing silane compound (B) is represented by formula (S3), and the structure or the value of $R^{f1}$, $R^{f2}$, p, q, $R^{F11}$, $X^A$, α, β, γ, $Z^1$, $R^{21}$, $R^{22}$, p1, and q1 of the fluoropolyether group-containing silane compound (A) are completely same as the structure or the value of $R^{f1}$, $R^{f2}$, p, q, $R^{F21}$, $X^A$, α, β, γ, $Z^1$, $R^{21}$, $R^{22}$, p1, and q1 of the fluoropolyether group-containing silane compound (B), respectively. That is, when $R^{Si}$ in the fluoropolyether group-containing silane compound (A) is represented by formula (S12) and $R^{Si}$ in the fluoropolyether group-containing silane compound (B) is represented by formula (S3), at least one of $R^{f1}$, $R^{f2}$, p, q, $R^{F11}$, $X^A$, α, β, γ, $Z^1$, $R^{21}$, $R^{22}$, p1, and q1 of the fluoropolyether group-containing silane compound (A) has a different structure or value from $R^{f1}$, $R^{f2}$, p, q, $R^{F21}$, $X^A$, α, β, γ, $Z^1$, $R^{21}$, $R^{22}$, p1, and q1 of the fluoropolyether group-containing silane compound (B).

Here, "$R^{F11}$ of the fluoropolyether group-containing silane compound (A) has a different structure from $R^{F21}$ of the fluoropolyether group-containing silane compound (B)" means, specifically, at least one of the case where the value of a in $R^{F11}$ and the value of a in $R^{F21}$ is different, the value of b in $R^{F11}$ and the value of b in $R^{F21}$ is different, the value of c in $R^{F11}$ and the value of c in $R^{F21}$ is different, the value of d in $R^{F11}$ and the value of d in $R^{F21}$ is different, the value of f in $R^{F11}$ and the value of f in $R^{F21}$ is different. $R^{F11}$ of the fluoropolyether group-containing silane compound (A) and $R^{F21}$ of the fluoropolyether group-containing silane compound (B) have the same type of repeating units.

In one embodiment, when the fluoropolyether group-containing silane compound (A) is represented by formula (1) and $R^{Si}$ is represented by formula (S12), and the fluoropolyether group-containing silane compound (B) is represented by formula (1) and $R^{Si}$ is represented by formula (S3), at least one of $R^{f1}$, q, $R^{F11}$, $X^A$, α, β, γ, and $Z^1$ of the fluoropolyether group-containing silane compound (A) has a different structure or a different value from $R^{f1}$, q, $R^{F21}$, $X^A$, α, β, γ, and $Z^1$ of the fluoropolyether group-containing silane compound (B).

In one embodiment, when the fluoropolyether group-containing silane compound (A) is represented by formula (2) and $R^{Si}$ is represented by formula (S12), and the fluoropolyether group-containing silane compound (B) is represented by formula (2) and $R^{Si}$ is represented by formula (S3), at least one of $R^{f2}$, p, q, $R^{F11}$, $X^A$, α, β, γ, and $Z^1$ of the fluoropolyether group-containing silane compound (A) has a different structure or a different value from $R^{f2}$, p, q, $R^{F21}$, $X^A$, α, β, γ, and $Z^1$ of the fluoropolyether group-containing silane compound (B).

In one embodiment, when $R^{Si}$ in the fluoropolyether group-containing silane compound (A) is represented by formula (S12) and $R^{Si}$ in the fluoropolyether group-containing silane compound (B) is represented by formula (S3), at least one of $R^{f1}$, $R^{f2}$, p, q, $R^{F11}$, $X^A$, α, β, γ, and $Z^1$ of the fluoropolyether group-containing silane compound (A) has a different structure or a different value from $R^{f1}$, $R^{f2}$, p, q, $R^{F21}$, $X^A$, α, β, γ, and $Z^1$ of the fluoropolyether group-containing silane compound (B).

In one embodiment, when $R^{Si}$ in the fluoropolyether group-containing silane compound (A) is represented by formula (S12) and $R^{Si}$ in the fluoropolyether group-containing silane compound (B) is represented by formula (S3), at least one of $R^{F11}$ and $X^A$ of the fluoropolyether group-containing silane compound (A) has a different structure from $R^{F21}$ and $X^A$ of the fluoropolyether group-containing silane compound (B).

In one embodiment, $R^{Si}$ in the fluoropolyether group-containing silane compound (A) is represented by formula (S11), and $R^{Si}$ in the fluoropolyether group-containing silane compound (B) is represented by formula (S2), (S3), or (S4).

In one embodiment, $R^{Si}$ in the fluoropolyether group-containing silane compound (A) is represented by formula (S11), and $R^{Si}$ in the fluoropolyether group-containing silane compound (B) is represented by formula (S2).

In one embodiment, $R^{Si}$ in the fluoropolyether group-containing silane compound (A) is represented by formula (S11), and $R^{Si}$ in the fluoropolyether group-containing silane compound (B) is represented by formula (S3).

In one embodiment, $R^{Si}$ in the fluoropolyether group-containing silane compound (A) is represented by formula (S11), and $R^{Si}$ in the fluoropolyether group-containing silane compound (B) is represented by formula (S4).

In one embodiment, $R^{Si}$ in the fluoropolyether group-containing silane compound (A) is represented by formula (S12), and $R^{Si}$ in the fluoropolyether group-containing silane compound (B) is represented by formula (S2).

In one embodiment, $R^{Si}$ in the fluoropolyether group-containing silane compound (A) is represented by formula (S12), and $R^{Si}$ in the fluoropolyether group-containing silane compound (B) is represented by formula (S3). In the present embodiment, a case is excluded, where the structure or the value of $R^{f1}$, $R^{f2}$, p, q, $R^{F11}$, $X^A$, α, β, γ, $Z^1$, $R^{21}$, $R^{22}$, p1, and q1 of the fluoropolyether group-containing silane compound (A) are completely same as $R^{f1}$, $R^{f2}$, p, q, $R^{F21}$, $X^A$, α, β, γ, $Z^1$, $R^{21}$, $R^{22}$, p1, and q1 of the fluoropolyether group-containing silane compound (B), respectively.

In one embodiment, $R^{Si}$ in the fluoropolyether group-containing silane compound (A) is represented by formula (S12), and $R^{Si}$ in the fluoropolyether group-containing silane compound (B) is represented by formula (S4).

In one embodiment, the fluoropolyether-containing silane compounds (A) and (B) are both represented by formula (1).

In one embodiment, the fluoropolyether-containing silane compounds (A) and (B) are both represented by formula (2).

In one embodiment, the fluoropolyether group-containing silane compounds (A) and (B) are both represented by formula (1), and $R^{Si}$ in the fluoropolyether group-containing silane compound (A) is a group represented by formula (S11).

In one embodiment, the fluoropolyether group-containing silane compounds (A) and (B) are both represented by formula (2), and $R^{Si}$ in the fluoropolyether group-containing silane compound (A) is a group represented by formula (S11).

In one embodiment, the fluoropolyether group-containing silane compounds (A) and (B) are both represented by formula (1), and $R^{Si}$ in the fluoropolyether group-containing silane compound (B) is a group represented by formula (S2).

In one embodiment, the fluoropolyether group-containing silane compounds (A) and (B) are both represented by formula (1), and $R^{Si}$ in the fluoropolyether group-containing silane compound (B) is a group represented by formula (S3).

In one embodiment, the fluoropolyether group-containing silane compounds (A) and (B) are both represented by formula (1), and $R^{Si}$ in the fluoropolyether group-containing silane compound (B) is a group represented by formula (S4).

In one embodiment, the fluoropolyether group-containing silane compounds (A) and (B) are both represented by formula (1); $R^{Si}$ in the fluoropolyether group-containing silane compound (A) is a group represented by formula (S12); and $R^{Si}$ in the fluoropolyether group-containing silane compound (B) is a group represented by formula (S2) or (S4).

In one embodiment, the fluoropolyether group-containing silane compounds (A) and (B) are both represented by formula (2); $R^{Si}$ in the fluoropolyether group-containing silane compound (A) is a group represented by formula (S12); and $R^{Si}$ in the fluoropolyether group-containing silane compound (B) is a group represented by formula (S2) or (S4).

In the fluoropolyether group-containing silane compounds (A) and (B), p1 is preferably 2 or 3, and more preferably 3.

The surface-treating agent of the present disclosure contains the fluoropolyether-containing silane compound (A) and the fluoropolyether-containing silane compound (B). With such a configuration, the surface-treating agent of the present disclosure can provide a surface-treating layer having water-repellency, oil-repellency, antifouling properties (e.g., preventing grime such as fingerprints from adhering), waterproof properties (preventing water from entering electronic components and the like), surface lubricity (or lubricity, for example, such as removability by wiping of grim such as fingerprints, and excellent tactile sensations to the fingers), friction durability, transparency, and the like, which may be suitably used as a functional thin film.

In the fluoropolyether group-containing silane compound (A) contained in the surface-treating agent of the present disclosure, three groups represented by $(Z^1-SiR^{21}_{p1}R^{22}_{q1})$ are bonded to a C atom or Si atom, wherein the C atom or Si atom is the branching point. In the fluoropolyether group-containing silane compound (A) with the above structure, tight-lattice siloxane three-dimensional crosslinks may not be formed when it is used to bond to a base material.

On the other hand, in the fluoropolyether group-containing silane compound (B), two groups represented by $(Z^1-SiR^{21}_{p1}R^{22}_{q1})$ are bonded to a C atom, a Si atom, or N atom, wherein the C atom, Si atom or N atom is the branching point. By using the fluoropolyether group-containing silane compound (B) with such a structure together with the fluoropolyether group-containing silane compound (A), a tight-lattice siloxane three-dimensional crosslink can be formed.

Further, in the surface-treating agent of the present disclosure, $R^{F11}$ of the fluoropolyether group-containing silane compound (A) and $R^{F21}$ of the fluoropolyether group-containing silane compound (B) have the same type of repeating units. Thus, it is considered that the miscibility between the fluoropolyether group-containing silane compounds (A) and (B) is increased. As a result, the fluoropolyether-containing silane compounds (A) and (B) can be easily mixed, and for example, both compounds can be mixed at any proportion.

Therefore, when the surface-treating agent of the present disclosure is used, it is possible to form a surface-treating layer which is particularly excellent in water-repellency, oil-repellency, friction durability and the like. In particular, it is possible to form a surface-treating layer which is particularly excellent in water-repellency, oil-repellency, friction durability, and the like, as compared with the case of using a surface-treating agent containing only a fluoropolyether group-containing silane compound (A) or (B).

The fluoropolyether-containing silane compound (A) is preferably contained in an amount of 5% by mass or more, more preferably 10% by mass or more, still more preferably 20% by mass or more, and may be contained in an amount of 40% by mass or more, 60% by mass or more, 65% by mass or more, 70% by mass or more based on the total amount of the fluoropolyether-containing silane compound (A) and the fluoropolyether-containing silane compound (B); and is preferably contained in an amount of 95% by mass or less, more preferably 90% by mass or less, still more preferably 85% by mass or less, and may be contained in an amount of 80% by mass or less. When the fluoropolyether-containing silane compound (A) is contained in such a content, a condensation reaction in which a silane coupling group is hydrolyzed to form a siloxane bond is promoted, and a dense network is formed in a three dimensional direction, thereby improving friction durability.

The fluoropolyether-containing silane compound (A) may be contained in an amount of 5 to 95% by mass, 10 to 90% by mass, 20 to 90% by mass, 40 to 90% by mass, 60 to 90% by mass, or 70 to 90% by mass based on the total amount of the fluoropolyether-containing silane compound (A) and the fluoropolyether-containing silane compound (B).

In one embodiment, the fluoropolyether group-containing silane compound (A) may be contained in an amount of 65 to 95% by mass based on the total amount of the fluoropolyether group-containing silane compound (A) and the fluoropolyether group-containing silane compound (B).

The compound represented by the formula (1) or (2) can be obtained, for example, by the method described in Patent Literature 2, JP 2008-297275 A, or the like.

In the surface-treating agent of the present disclosure, the content of the compound represented by formula (2) is preferably 0.1 mol % or more and 35 mol % or less based on the total of the compound represented by formula (1) and the compound represented by formula (2). The lower limit of the content of the compound represented by formula (2) based on the total of the compound represented by formula (1) and the compound represented by formula (2) may preferably be 0.1 mol %, more preferably 0.2 mol %, still more preferably 0.5 mol %, further preferably 1 mol %, particularly preferably 2 mol %, and especially 5 mol %. The upper limit of the content of the compound represented by formula (2) based on the total of the compound represented by formula (1) and the compound represented by formula (2) may preferably be 35 mol %, more preferably 30 mol %, still more preferably 20 mol %, further preferably 15 mol % or 10 mol %. The compound represented by formula (2) based on the total of the compound represented by formula (1) and the compound represented by formula (2) is preferably 0.1 mol % or more and 30 mol % or less, more preferably 0.1 mol % or more and 20 mol % or less, still more preferably 0.2 mol % or more and 10 mol % or less, further more preferably 0.5 mol % or more and 10 mol % or less, and particularly preferably 1 mol % or more and 10 mol % or less, for example, 2 mol % or more and 10 mol % or less, or 5 mol % or more and 10 mol % or less. By using the compound represented by formula (2) in such a range, the frictional durability of the formed surface-treating layer can be further improved.

(Other Compounds)

The surface-treating agent of the present disclosure may further contain a solvent, a (unreactive) fluoropolyether compound that can be understood as a fluorine-containing oil, preferably a perfluoro(poly)ether compound (hereinafter, collectively referred to as a "fluorine-containing oil"), a (unreactive) silicone compound that can be understood as a silicone oil (hereinafter, referred to as a "silicone oil"), a catalyst, a surfactant, a polymerization inhibitor, a sensitizer, and the like.

Examples of the above solvent include aliphatic hydrocarbons such as hexane, cyclohexane, heptane, octane, nonane, decane, undecane, dodecane, and mineral spirits; aromatic hydrocarbons such as benzene, toluene, xylene, naphthalene, and solvent naphtha; esters such as methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketones such as acetone, methyl ethyl ketone, methyl isobutyl ketone, 2-hexanone, cyclohexanone, methyl amino ketone, and 2-heptanone; glycol ethers such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether; alcohols such as methanol, ethanol, iso-propanol, n-butanol, isobutanol, tert-butanol, sec-butanol, 3-pentanol, octyl alcohol, 3-methyl-3-methoxybutanol, and tert-amyl alcohol; glycols such as ethylene glycol and propylene glycol; cyclic ethers such as tetrahydrofuran, tetrahydropyran, and dioxane; amides such as N,N-dimethylformamide and N,N-dimethylacetamide; ether alcohols such as methyl cellosolve, cellosolve, isopropyl cellosolve, butyl cellosolve, and diethylene glycol monomethyl ether; diethylene glycol monoethyl ether acetate; and fluorine-containing solvents such as 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane (HCFC 225), Zeorora H, HFE 7100, HFE 7200, and HFE 7300. Alternatively, the solvent may be a mixed solvent of two or more of such solvents.

Examples of the fluorine-containing oil include, but not limited to, a compound (perfluoro(poly)ether compound) represented by the following general formula (3):

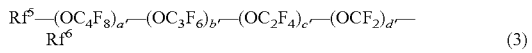

(3)

wherein $Rf^5$ represents an alkyl group having 1 to 16 carbon atoms optionally substituted with one or more fluorine atoms (preferably, $C_{1-16}$ perfluoroalkyl group), $Rf^6$ represents an alkyl group having 1 to 16 carbon atoms optionally substituted with one or more fluorine atoms (preferably, $C_{1-16}$ perfluoroalkyl group), a fluorine atom, or a hydrogen atom, and $Rf^5$ and $Rf^6$ are each independently, more preferably, a $C_{1-3}$ perfluoroalkyl group;

a', b', c' and d' represent the respective four numbers of repeating units in perfluoro(poly)ether constituting a main backbone of the polymer and are mutually independently an integer of 0 or more and 300 or less, the sum of a', b', c' and d' is at least 1, preferably 1 to 300, more preferably 20 to 300; the occurrence order of the respective repeating units in parentheses with the subscript a', b', c' or d' is not limited in the formula; among such repeating units, for example, —$(OC_4F_8)$— may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$— and —$(OCF_2CF(C_2F_5))$— and is preferably —$(OCF_2CF_2CF_2CF_2)$—; —$(OC_3F_6)$— may be any of —$(OCF_2CF_2CF_2)$—, —$(OCF(CF_3)CF_2)$— and —$(OCF_2CF(CF_3))$— and is preferably —$(OCF_2CF_2CF_2)$—; and —$(OC_2F_4)$— may be any of —$(OCF_2CF_2)$— and —$(OCF(CF_3))$— and is preferably —$(OCF_2CF_2)$—.

Examples of the perfluoro(poly)ether compound represented by general formula (3) include a compound represented by any of the following general formulae (3a) and (3b) (which may be used singly or as a mixture of two or more):

$$Rf^5\text{—}(OCF_2CF_2CF_2)_{b''}\text{—}Rf^6 \qquad (3a)$$

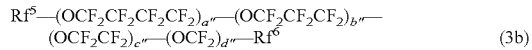

$$Rf^5\text{—}(OCF_2CF_2CF_2CF_2)_{a''}\text{—}(OCF_2CF_2CF_2)_{b''}\text{—}(OCF_2CF_2)_{c''}\text{—}(OCF_2)_{d''}\text{—}Rf^6 \qquad (3b)$$

In these formulae, $Rf^5$ and $Rf^6$ are as described above; in the formula (3a), b'' is an integer of 1 or more and 100 or less; and in the formula (3b), a'' and b'' are each independently an integer of 0 or more and 30 or less, and c'' and d'' are each independently an integer of 1 or more and 300 or less. The occurrence order of the respective repeating units in parentheses with the subscript a'', b'', c'', or d'' is not limited in the formula.

From another viewpoint, the fluorine-containing oil may be a compound represented by general formula $Rf^3$—F wherein $Rf^3$ is a $C_{5-16}$ perfluoroalkyl group. The fluorine-containing oil may be a chlorotrifluoroethylene oligomer.

The fluorine-containing oil may have an average molecular weight of 500 to 10,000. The molecular weight of the fluorine-containing oil may be measured using GPC.

The fluorine-containing oil may be contained in an amount of, for example, 0 to 50% by mass, preferably 0 to 30% by mass, and more preferably 0 to 5% by mass based on the composition (for example, surface-treating agent) of the present disclosure. In one embodiment, the composition of the present disclosure is substantially free from the fluorine-containing oil. Being substantially free from the fluorine-containing oil means that the fluorine-containing oil is not contained at all, or an extremely small amount of the fluorine-containing oil may be contained.

The fluorine-containing oil contributes to increasing the surface lubricity of a layer formed of the composition of the present disclosure.

For example, the silicone oil may be a linear or cyclic silicone oil having 2,000 or less siloxane bonds. The linear silicone oil may be so-called a straight silicone oil or modified silicone oil. Examples of the straight silicone oil include dimethyl silicone oil, methyl phenyl silicone oil, and methyl hydrogen silicone oil. Examples of the modified silicone oil include those obtained by modifying a straight silicone oil with alkyl, aralkyl, polyether, higher fatty acid ester, fluoroalkyl, amino, epoxy, carboxyl, alcohol, or the like. Examples of the cyclic silicone oil include cyclic dimethylsiloxane oil.

In the composition of the present disclosure (for example, a surface-treating agent), such a silicone oil may be contained in an amount of, for example, 0 to 300 parts by mass, and preferably 50 to 200 parts by mass, based on total 100 parts by mass of the above fluoropolyether group-containing silane compound of the present disclosure (in the case of two or more kinds, the total thereof, and the same applies below).

The silicone oil contributes to increasing the surface lubricity of the surface-treating layer.

Examples of the above catalyst include an acid (for example, acetic acid, trifluoroacetic acid), a base (for example, ammonia, triethylamine, diethylamine) and a transition metal (for example, Ti, Ni, Sn).

The catalyst promotes hydrolysis and dehydrative condensation of the fluoropolyether group-containing silane compound of the present disclosure, and promotes formation of a layer formed of the composition of the present disclosure (for example, a surface-treating agent).

Examples of the other components include, in addition to those described above, tetraethoxysilane, methyltrimethoxysilane, 3-aminopropyltrimethoxysilane, 3-glycidoxypropyltrimethoxysilane, and methyltriacetoxysilane.

The composition of the present disclosure can be used as a surface-treating agent for surface treatment of a base material.

The surface-treating agent of the present disclosure can be formed into pellets by impregnating a porous material such as a porous ceramic material or a metal fiber such as a fiber obtained by, for example, solidifying steel wool in a cotton-like form with the composition. Such pellets can be used in, for example, vacuum deposition.

(Article)

Hereinafter, an article of the present disclosure will be described.

An article of the present disclosure comprises a base material and a layer on a surface of the base material formed of the surface-treating agent of the present disclosure (surface-treating layer).

The base material that can be used in the present disclosure may be composed of any suitable material such as glass, a resin (which may be a natural or synthetic resin, for example, a common plastic material, and may be in the form of a plate, a film, or the like), a metal, ceramics, a semi-conductor (such as silicon and germanium), a fiber (such as woven fabric and nonwoven fabric), fur, leather, a wood material, a ceramic material, a stone material, or a building material.

For example, when the article to be produced is an optical member, the material constituting the surface of the base material may be a material for an optical member, such as glass or a transparent plastic. When the article to be produced is an optical member, some layer (or film) such as a hard coat layer or an antireflection layer may be formed on the surface (the outermost layer) of the base material. The antireflection layer may be any of a single-layer antireflection layer and a multi-layer antireflection layer. Examples of inorganic substances that can be used in the antireflection layer include $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, and $WO_3$. One of these inorganic substances may be used singly, or two or more may be used in combination (for example, as a mixture). In the case of a multi-layer antireflection layer, SiO$_2$ and/or SiO is preferably used in the outermost layer thereof. When the article to be produced is an optical glass component for a touch panel, a part of the surface of the base material (glass) may have a transparent electrode such as a thin film in which indium tin oxide (ITO), indium zinc oxide, or the like is used. The base material, according to its specific configuration or the like, may have an insulating layer, an adhesive layer, a protecting layer, a decorated frame layer (I-CON), an atomizing film layer, a hard coating layer, a polarizing film, a phase difference film, a liquid crystal display module, or the like.

The shape of the base material is not limited. The surface region of the base material on which a surface-treating layer is to be formed may be at least a part of the base material surface, and may be suitably determined according to the application, specific specifications, and the like of an article to be produced.

The base material, or at least the surface portion thereof, may be composed of a material originally having a hydroxyl group. Examples of the material include glass as well as metal (in particular, base metal) wherein a natural oxidized film or a thermal oxidized film is formed on the surface, ceramics, semiconductors, and the like. Alternatively, when the base material has an insufficient amount of a hydroxyl group or when the base material originally does not have a hydroxyl group as in resin and the like, a pre-treatment may be performed on the base material to thereby introduce or increase a hydroxyl group on the surface of the base material. Examples of such a pre-treatment include a plasma treatment (for example, corona discharge) and ion beam irradiation. The plasma treatment can be suitably utilized to not only introduce or increase a hydroxyl group on the surface of the base material, but also clean the surface of the base material (remove foreign matter and the like). Another example of such a pre-treatment includes a method wherein a monolayer of a surface adsorbent having a carbon-carbon unsaturated bonding group is formed on the surface of the base material by a LB method (a Langmuir-Blodgett method), a chemical adsorption method, or the like beforehand, and thereafter cleaving the unsaturated bond under an atmosphere containing oxygen, nitrogen, or the like.

Alternatively, the base material, or at least a surface portion thereof, may be composed of a silicone compound having one or more other reactive groups such as a Si—H group, or a material containing alkoxysilane.

Then, on the surface of such a base material, a layer of the above surface-treating agent of the present disclosure is formed, this layer is post-treated as necessary, and thereby a layer is formed from the surface-treating agent of the present disclosure.

The layer of the surface-treating agent of the present disclosure can be formed by applying the above composition on the surface of the base material such that the composition coats the surface. The coating method is not limited. For example, a wet coating method and a dry coating method can be used.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, vacuum deposition method) include resistive heating, high-frequency heating using electron beam, microwave or the like, ion beam, and similar methods. Specific examples of the CVD method include plasma-CVD, optical CVD, thermal CVD, and similar methods.

Furthermore, coating by an atmospheric pressure plasma method can be performed.

When using the wet coating method, the surface-treating agent of the present disclosure can be applied to the surface of the base material after being diluted with a solvent. From the viewpoint of the stability of the composition of the present disclosure and the volatility of solvents, the following solvents are preferably used: perfluoroaliphatic hydrocarbons having 5 to 12 carbon atoms (such as perfluorohexane, perfluoromethylcyclohexane, and perfluoro-1,3-dimethylcyclohexane); polyfluoroaromatic hydrocarbons (such as bis(trifluoromethyl)benzene); polyfluoroaliphatic hydrocarbons (such as $C_6F_{13}CH_2CH_3$ (such as Asahiklin® AC-6000 manufactured by Asahi Glass Co., Ltd.), and 1,1,2,2,3,3,4-heptafluorocyclopentane (such as Zeorora® H manufactured by Zeon Corporation)); alkyl perfluoroalkyl ethers (the perfluoroalkyl group and the alkyl group may be linear or branched) such as hydrofluoroether (HFE) (such as perfluoropropylmethyl ether ($C_3F_7OCH_3$) (such as Novec (trademark) 7000 manufactured by Sumitomo 3M Limited), perfluorobutyl methyl ether ($C_4F_9OCH_3$) (such as Novec (trademark) 7100 manufactured by Sumitomo 3M Limited), perfluorobutyl ethyl ether ($C_4F_9OC_2H_5$) (such as Novec (trademark) 7200 manufactured by Sumitomo 3M Limited), and perfluorohexyl methyl ether ($C_2F_5CF(OCH_3)C_3F_7$) (such as Novec (trademark) 7300 manufactured by Sumitomo 3M Limited), or $CF_3CH_2OCF_2CHF_2$ (such as Asahiklin® AE-3000 manufactured by Asahi Glass Co., Ltd.)). These solvents may be used alone or as a mixture prepared by mixing two or more thereof in combination. In particular, hydrofluoroether is preferable, and perfluorobutyl methyl ether ($C_4F_9OCH_3$) and/or perfluorobutyl ethyl ether ($C_4F_9OC_2H_5$) is particularly preferable.

When using the dry coating method, the surface-treating agent of the present disclosure may be directly subjected to the dry coating method, or may be diluted with the above solvent before being subjected to the dry coating method.

A layer of the surface-treating agent is preferably formed such that the surface-treating agent of the present disclosure coexists in the layer with a catalyst for hydrolysis and dehydrative condensation. Conveniently, in the case of a wet coating method, the surface-treating agent of the present disclosure is diluted with a solvent, and then, immediately before application to the surface of the base material, a catalyst may be added to the diluent of the surface-treating agent of the present disclosure. In the case of a dry coating method, the surface-treating agent of the present disclosure to which a catalyst has been added is directly used to a deposition (usually vacuum deposition) treatment, or a pellet-like material may be used to a deposition (usually vacuum deposition) treatment, wherein the pellets is obtained by impregnating a porous body of metal such as iron or copper with the surface-treating agent of the present disclosure to which the catalyst has been added.

The catalyst may be any suitable acid or base. The acid catalyst may be, for example, acetic acid, formic acid, or trifluoroacetic acid. The base catalyst may be, for example, ammonia or organic amine.

In the above-described manner, a layer derived from the surface-treating agent of the present disclosure is formed on the surface of the base material, and the article of the present disclosure is produced. The layer thus obtained has both high surface lubricity and high friction durability. The above layer may have not only high friction durability but also have, depending on the compositional features of the surface-treating agent used, water-repellency, oil-repellency, antifouling property (for example, preventing fouling such as fingerprints from adhering), waterproof property (preventing water from penetrating into electronic components and the like), surface lubricity (or lubricity, such as wiping property for fouling including fingerprints and the like and excellent tactile sensations to the fingers), and the like, and may be suitably utilized as a functional thin film.

That is to say, the present disclosure further relates to an optical material having a cured product of the composition of the present disclosure in the outermost layer.

The optical material preferably includes a wide variety of optical materials in addition to optical materials relating to displays and the like as exemplified below: for example, displays such as cathode ray tubes (CRTs; e.g., PC monitors), liquid crystal displays, plasma displays, organic EL displays, inorganic thin-film EL dot matrix displays, rear projection displays, vacuum fluorescent displays (VFDs), field emission displays (FEDs); protective plates for such displays; and those obtained by performing an antireflection film treatment on their surfaces.

The article having a layer obtained according to the present disclosure may be, but is not limited to, an optical member. Examples of the optical member include lenses of glasses or the like; front surface protective plates, antireflection plates, polarizing plates, and anti-glare plates for displays such as PDPs and LCDs; touch panel sheets for devices such as mobile phones and personal digital assistants; disc surfaces of optical discs such as Blu-ray® discs, DVD discs, CD-Rs, and MOs; optical fibers; and display surfaces of watches and clocks.

The article having a layer obtained according to the present disclosure may be medical equipment or a medical material.

Further, the article having the layer obtained according to the present disclosure may be an interior or exterior of an automobile, such as a headlight cover, a side mirror, a side window, an interior decorative film, a center console, a meter panel, a camera lens cover, and the like.

The thickness of the above layer is not limited. The thickness of the layer in the case of an optical member is in the range of 1 to 50 nm, 1 to 30 nm, and preferably 1 to 15 nm, from the viewpoint of optical performance, surface lubricity, friction durability, and antifouling properties.

The article obtained by using the composition of the present disclosure (e.g., a surface-treating agent) has been described in detail above. The application and the method for using the composition of the present disclosure, and the method for producing an article, are not limited to those exemplified above.

The present disclosure provides [1] to [23] below.

[1] A surface-treating agent comprising a fluoropolyether group-containing silane compound (A) and a fluoropolyether group-containing silane compound (B) which are represented by formula (1) or (2):

$$R^{F1}_\alpha-X^A-R^{Si}_\beta \quad (1)$$

$$R^{Si}_\gamma-X^A-R^{F2}-X^A-R^{Si}_\gamma \quad (2)$$

wherein
$R^{F1}$ is $Rf^1-R^F-O_q-$;
$R^{F2}$ is $-Rf^2_p-R^F-O_q-$;
$Rf^1$ is each independently at each occurrence a $C_{1-16}$ alkyl group optionally substituted with one or more fluorine atoms;
$Rf^2$ is a $C_{1-6}$ alkylene group optionally substituted with one or more fluorine atoms;
$R^F$ is a divalent fluoropolyether group;
p is 0 or 1;
q is each independently at each occurrence 0 or 1;
$X^A$ is each independently a single bond or a di- to decavalent organic group;
$R^{Si}$ is each independently at each occurrence a group having a Si atom bonded to a hydrolyzable group;
α is an integer of 1 to 9;
β is an integer of 1 to 9; and
γ is each independently an integer of 1 to 9;
wherein, in the fluoropolyether group-containing silane compound (A),
$R^F$ is represented by $R^{F11}$;
$R^{F11}$ is a fluoropolyether group represented by formula:

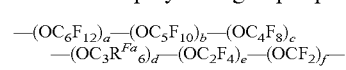

wherein $R^{Fa}$ is each independently at each occurrence a hydrogen atom, a fluorine atom, or a chlorine atom; and
a, b, c, d, e and f are each independently at each occurrence an integer of 0 to 200, the sum of a, b, c, d, e and f is 1 or more, and the occurrence order of the respective repeating units in parentheses with a, b, c, d, e or f is not limited in the formula;
$R^{Si}$ is each independently at each occurrence represented by the following formula (S11) or (S12):

$$-C(Z^1-SiR^{21}_{p1}R^{22}_{q1})_3 \quad (S11)$$

$$-Si(Z^1-SiR^{21}_{p1}R^{22}_{q1})_3 \quad (S12)$$

wherein
$Z^1$ is each independently at each occurrence a divalent organic group;
$R^{21}$ is each independently at each occurrence a hydroxyl group or a hydrolyzable group;
$R^{22}$ is each independently at each occurrence a hydrogen atom or a monovalent organic group;
p1 is each independently at each occurrence an integer of 1 to 3; and
q1 is each independently at each occurrence an integer of 0 to 2; and
in the fluoropolyether group-containing silane compound (B),
$R^F$ is represented by $R^{F21}$;
$R^{F21}$ is represented by formula:

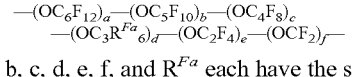

a, b, c, d, e, f, and $R^{Fa}$ each have the same meaning as in $R^{F11}$, provided that the structure of each of the repeating units in $R^{F21}$ is same as the structure of each of the repeating units in $R^{F11}$; and
$R^{Si}$ is each independently at each occurrence represented by the following formula (S2), (S3), or (S4):

$$-C(Z^1-SiR^{21}_{p1}R^{22}_{q1})_2R^{e1} \quad (S2)$$

$$-Si(Z^1-SiR^{21}_{p1}R^{22}_{q1})_2R^{e1} \quad (S3)$$

$$-N(Z^1-SiR^{21}_{p1}R^{22}_{q1})_2 \quad (S4)$$

wherein
$Z^1$, $R^{21}$, $R^{22}$, p1, and q1 have the same meaning as in formula (S11) and formula (S12); and
$R^{e1}$ is each independently a hydrogen atom, a hydroxyl group, or a monovalent organic group,
provided that a case is excluded, where $R^{Si}$ in the fluoropolyether group-containing silane compound (A) is represented by formula (S12) and $R^{Si}$ in the fluoropolyether group-containing silane compound (B) is represented by formula (S3), and the structure or the value of $R^{f1}$, $R^{f2}$, p, q, $R^{F11}$, $X^A$, α, β, γ, $Z^1$, $R^{21}$, $R^{22}$, p1, and q1 of the fluoropolyether group-containing silane compound (A) are completely same as the structure or the value of $R^{f1}$, $R^{f2}$, p, q, $R^{F21}$, $X^A$, α, β, γ, $Z^1$, $R^{21}$, $R^{22}$, p1, and q1 of the fluoropolyether group-containing silane compound (B), respectively.

[2] The surface-treating agent according to [1], wherein $R^{Fa}$ is a fluorine atom.

[3] The surface-treating agent according to [1] or [2], wherein $R^{F11}$ and $R^{F21}$ are groups represented by formula (f1), (f2), (f3), (f4), or (f5):

$$—(OC_3F_6)_d—$$ (f1)

wherein d is an integer of 1 to 200;

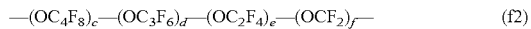
$$—(OC_4F_8)_c—(OC_3F_6)_d—(OC_2F_4)_e—(OCF_2)_f—$$ (f2)

wherein c and d are each independently an integer of 0 to 30;
e and f are each independently an integer of 1 to 200;
the sum of c, d, e, and f is an integer of 10 to 200; and
the occurrence order of the respective repeating units in parentheses with the subscript c, d, e, or f is not limited in the formula;

$$—(R^6—R^7)_g—$$ (f3)

wherein $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or is a combination of two or three groups selected from these groups; and
g is an integer of 2 to 100;

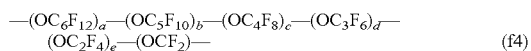
$$—(OC_6F_{12})_a—(OC_5F_{10})_b—(OC_4F_8)_c—(OC_3F_6)_d—(OC_2F_4)_e—(OCF_2)—$$ (f4)

wherein e is an integer of 1 or more and 200 or less, a, b, c, d, and f are each independently an integer of 0 or more and 200 or less, the sum of a, b, c, d, e, and f is at least 1, and the occurrence order of the respective repeating units in parentheses with a, b, c, d, e, or f is not limited in the formula; and

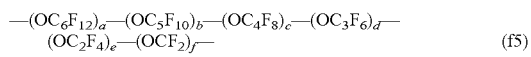
$$—(OC_6F_{12})_a—(OC_5F_{10})_b—(OC_4F_8)_c—(OC_3F_6)_d—(OC_2F_4)_e—(OCF_2)_f—$$ (f5)

wherein f is an integer of 1 or more and 200 or less, a, b, c, d, and e are each independently an integer of 0 or more and 200 or less, the sum of a, b, c, d, e, and f is at least 1, and the occurrence order of the respective repeating units in parentheses with a, b, c, d, e, or f is not limited in the formula.

[4] The surface-treating agent according to any one of [1] to [3], wherein the number-average molecular weights of $R^{F1}$ and $R^{F2}$ are each in a range of 500 to 30,000.

[5] The surface-treating agent according to any one of [1] to [4], wherein in $R^F$, e and f are each independently an integer of 1 to 200; and a ratio of e to f is in a range of 0.1 to 10.

[6] The surface-treating agent according to any one of [1] to [5], wherein α, β, and γ are each 1.

[7] The surface-treating agent according to any one of [1] to [6], wherein $X^A$ is a $C_{1-20}$ alkylene group,
—$(CH_2)_{s5}$—$X^{53}$—,
—$(CH_2)_{s5}$—$X^{53}$—$(CH_2)_{t5}$—
—$X^{54}$— or
—$X^{54}$—$(CH_2)_{t5}$—,
wherein
s5 is an integer of 1 to 20;
$X^{53}$ is —O—, —$CONR^{54}$—, or —O—$CONR^{54}$—;
$R^{54}$ each independently represents a hydrogen atom, a phenyl group, or a $C_{1-6}$ alkyl group;
t5 is an integer of 1 to 20; and $X^{54}$ is —$C(O)O$—, —$CONR^{54}$—, or —O—$CONR^{54}$—.

[8] The surface-treating agent according to any one of [1] to [7], wherein $Z^1$ is
a $C_{1-6}$ alkylene group,
—$(CH_2)_{z1}$—O—$(CH_2)_{z2}$—, wherein z1 and z2 are each independently at each occurrence an integer 0 to 6, or
—$(CH_2)_{z3}$-phenylene-$(CH_2)_{z4}$—, wherein z3 and z4 are each independently at each occurrence an integer of 0 to 6.

[9] The surface-treating agent according to any one of [1] to [8], wherein p1 is 3.

[10] The surface-treating agent according to any one of [1] to [9], wherein the fluoropolyether group-containing silane compound (A) is contained in an amount of 5% by mass or more based on a total amount of the fluoropolyether group-containing silane compound (A) and the fluoropolyether group-containing silane compound (B).

[11] The surface-treating agent according to any one of [1] to [10], wherein the fluoropolyether group-containing silane compound (A) is contained in an amount of 5 to 95% by mass based on a total amount of the fluoropolyether group-containing silane compound (A) and the fluoropolyether group-containing silane compound (B).

[12] The surface-treating agent according to any one of [1] to [11], wherein $R^{Si}$ in the fluoropolyether group-containing silane compound (B) is represented by formula (S2).

[13] The surface-treating agent according to any one of [1] to [11], wherein $R^{Si}$ in the fluoropolyether group-containing silane compound (B) is represented by formula (S3).

[14] The surface-treating agent according to any one of [1] to [11], wherein $R^{Si}$ in the fluoropolyether group-containing silane compound (B) is represented by formula (S4).

[15] The surface-treating agent according to any one of [1] to [11], wherein $R^{Si}$ in the fluoropolyether group-containing silane compound (A) is represented by formula (S11), and $R^{Si}$ in the fluoropolyether group-containing silane compound (B) is represented by formula (S2), (S3), or (S4).

[16] The surface-treating agent according to any one of [1] to [11], wherein $R^{Si}$ in the fluoropolyether group-containing silane compound (A) is represented by formula (S12), and $R^{Si}$ in the fluoropolyether group-containing silane compound (B) is represented by formula (S2) or (S4).

[17] The surface-treating agent according to any one of [1] to [16], further comprising one or more other components selected from a fluorine-containing oil, a silicone oil, and a catalyst.

[18] The surface-treating agent according to any one of [1] to [17], further comprising a solvent.

[19] The surface-treating agent according to any one of [1] to [18], which is used as an antifouling coating agent or a water-proof coating agent.

[20] The surface-treating agent according to any one of [1] to [19], which is for vacuum deposition.

[21] A pellet comprising the surface-treating agent according to any one of [1] to [20].

[22] An article comprising a base material and a layer on a surface of the base material, wherein the layer is formed of the surface-treating agent according to any one of [1] to [20].

[23] The article according to [22], which is an optical member.

EXAMPLES

Hereinafter, the present disclosure will be described by way of Examples, but the present disclosure is not intended to be limited to the following Examples. In the Examples, all chemical formulae shown below indicate average compositional features, and the occurrence order of repeating units (such as (OCF$_2$CF$_2$CF$_2$CF$_2$), (OCF$_2$CF$_2$CF$_2$), (OCF$_2$CF$_2$), and (OCF$_2$)) constituting perfluoropolyether is not limited. Hereinafter, "Me" represents CH$_3$.

The following compounds were prepared as the fluoropolyether group-containing compound.

Compound (A)

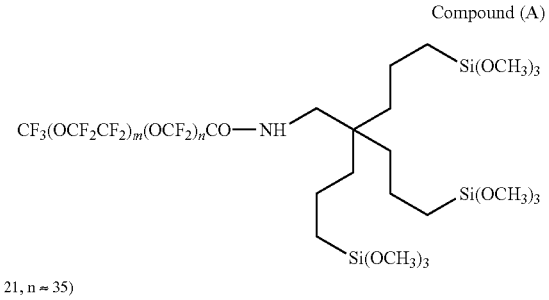

(m ≈ 21, n ≈ 35)

(the average composition included 0.27 repeating units of (OCF$_2$CF$_2$CF$_2$CF$_2$) and 0.42 repeating units of (OCF$_2$CF$_2$CF$_2$), but these were omitted due to their small amount. Further, a compound (A') having —C(CH$_2$CH$_2$CH$_2$Si(OCH$_3$)$_3$)$_3$ at both ends was contained in an amount of 3.2 mol % based on the total of the compound (A) and the compound (A').)

Compound (B)

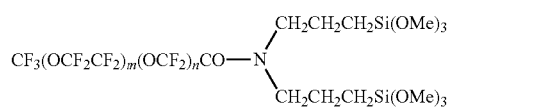

(m ≈ 21, n ≈ 35)

(the average composition included 0.30 repeating units of (OCF$_2$CF$_2$CF$_2$CF$_2$) and 0.44 repeating units of (OCF$_2$CF$_2$CF$_2$), but these were omitted due to their small amount. Further, a compound (B') having —N(CH$_2$CH$_2$CH$_2$Si(OCH$_3$)$_3$)$_2$ at both ends was contained in an amount of 3.0 mol % based on the total of the compound (B) and the compound (B').)

Compound (C)

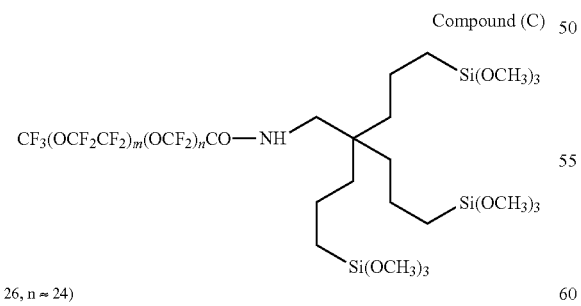

(m ≈ 26, n ≈ 24)

(the average composition included 1.23 repeating units of (OCF$_2$CF$_2$CF$_2$CF$_2$) and 0.65 repeating units of (OCF$_2$CF$_2$CF$_2$), but these were omitted due to their small amount. Further, a compound (C') having —C(CH$_2$CH$_2$CH$_2$Si(OCH$_3$)$_3$)$_3$ at both ends was contained in an amount of 7.9 mol % based on the total of the compound (C) and the compound (C').)

Compound (D)

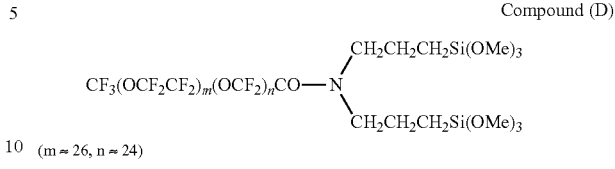

(m ≈ 26, n ≈ 24)

(the average composition included 1.35 repeating units of (OCF$_2$CF$_2$CF$_2$CF$_2$) and 0.69 repeating units of (OCF$_2$CF$_2$CF$_2$), but these were omitted due to their small amount. Further, a compound (D') having —N(CH$_2$CH$_2$CH$_2$Si(OCH$_3$)$_3$)$_2$ at both ends was contained in an amount of 8.1 mol % based on the total of the compound (D) and the compound (D').)

Compound (E)

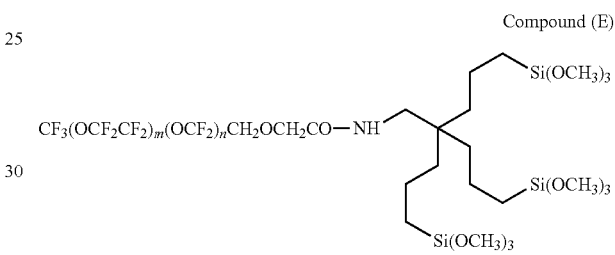

(m ≈ 21, n ≈ 35)

(the average composition included 0.31 repeating units of (OCF$_2$CF$_2$CF$_2$CF$_2$) and 0.44 repeating units of (OCF$_2$CF$_2$CF$_2$), but these were omitted due to their small amount. Further, a compound (E') having —C(CH$_2$CH$_2$CH$_2$Si(OCH$_3$)$_3$)$_3$ at both ends was contained in an amount of 3.8 mol % based on the total of the compound (E) and the compound (E').)

Compound (F)

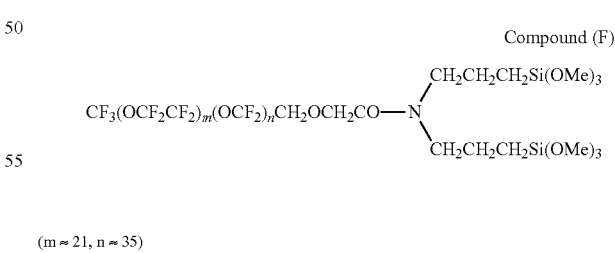

(m ≈ 21, n ≈ 35)

(the average composition included 0.34 repeating units of (OCF$_2$CF$_2$CF$_2$CF$_2$) and 0.40 repeating units of (OCF$_2$CF$_2$CF$_2$), but these were omitted due to their small amount. Further, a compound (F') having —N(CH$_2$CH$_2$CH$_2$Si(OCH$_3$)$_3$)$_2$ at both ends was contained in an amount of 3.9 mol % based on the total of the compound (F) and the compound (F').)

Compound (G)

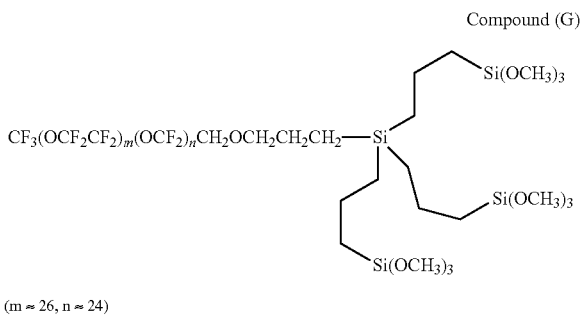

(m ≈ 26, n ≈ 24)

(the average composition included 1.32 repeating units of $(OCF_2CF_2CF_2CF_2)$ and 0.70 repeating units of $(OCF_2CF_2CF_2)$, but these were omitted due to their small amount. Further, a compound (G') having —Si$(CH_2CH_2CH_2Si(OCH_3)_3)_3$ at both ends was contained in an amount of 8.0 mol % based on the total of the compound (G) and the compound (G').)

Compound (H)

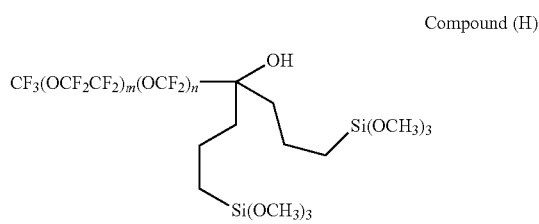

(m ≈ 26, n ≈ 28)

(the average composition included 1.22 repeating units of $(OCF_2CF_2CF_2CF_2)$ and 1.76 repeating units of $(OCF_2CF_2CF_2)$, but these were omitted due to their small amount. Further, a compound (H') having —C(OH)$(CH_2CH_2CH_2Si(OCH_3)_3)_2$ at both ends was contained in an amount of 6.5 mol % based on the total of the compound (H) and the compound (H').)

Compound (I)

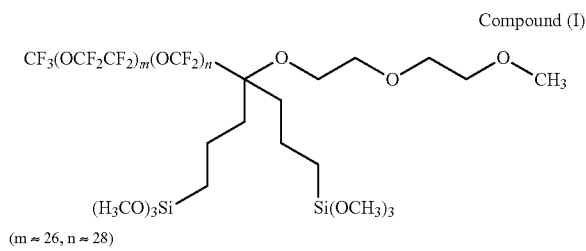

(m ≈ 26, n ≈ 28)

(the average composition included 2.21 repeating units of $(OCF_2CF_2CF_2CF_2)$ and 2.53 repeating units of $(OCF_2CF_2CF_2)$, but these were omitted due to their small amount. Further, a compound (I') having —C[(OCH$_2$CH$_2$)$_2$CH$_3$]$(CH_2CH_2CH_2Si(OCH_3)_3)_2$ at both ends was contained in an amount of 6.2 mol % based on the total of the compound (I) and the compound (I').)

Compound (J)

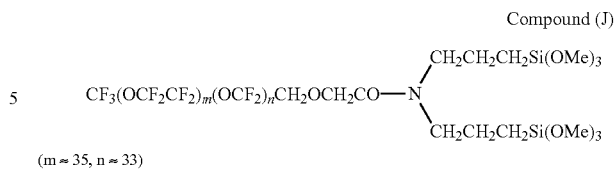

(m ≈ 35, n ≈ 33)

(the average composition included 1.25 repeating units of $(OCF_2CF_2CF_2CF_2)$ and 2.03 repeating units of $(OCF_2CF_2CF_2)$, but these were omitted due to their small amount. Further, a compound (J') having —N$(CH_2CH_2CH_2Si(OCH_3)_3)_2$ at both ends was contained in an amount of 7.8 mol % based on the total of the compound (J) and the compound (J').)

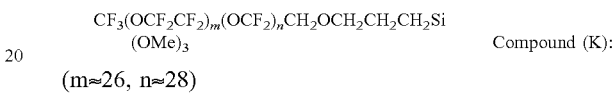

Compound (K):

(m≈26, n≈28)

(the average composition included 1.20 repeating units of $(OCF_2CF_2CF_2CF_2)$ and 1.75 repeating units of $(OCF_2CF_2CF_2)$. Further, a compound (K') having Si$(OCH_3)_3$ at both ends was contained in an amount of 4.8 mol % based on the total of the compound (K) and the compound (K').)

The compound (A) was dissolved in hydrofluoroether (Novec HFE-7200, manufactured by 3M) such that the solid concentration was 0.1% by mass to prepare a diluent (1).

The compound (B) was dissolved in hydrofluoroether (Novec HFE-7200, manufactured by 3M) such that the solid concentration was 0.1% by mass to prepare a diluent (2).

The compound (C) was dissolved in hydrofluoroether (Novec HFE-7200, manufactured by 3M) such that the solid concentration was 0.1% by mass to prepare a diluent (3).

The compound (D) was dissolved in hydrofluoroether (Novec HFE-7200, manufactured by 3M) such that the solid concentration was 0.1% by mass to prepare a diluent (4).

The compound (E) was dissolved in hydrofluoroether (Novec HFE-7200, manufactured by 3M) such that the solid concentration was 0.1% by mass to prepare a diluent (5).

The compound (F) was dissolved in hydrofluoroether (Novec HFE-7200, manufactured by 3M) such that the solid concentration was 0.1% by mass to prepare a diluent (6).

The compound (G) was dissolved in hydrofluoroether (Novec HFE-7200, manufactured by 3M) such that the solid concentration was 0.1% by mass to prepare a diluent (7).

The compound (I) was dissolved in hydrofluoroether (Novec HFE-7200, manufactured by 3M) such that the solid concentration was 0.1% by mass to prepare a diluent (8).

The compound (A) was dissolved in hydrofluoroether (Novec HFE-7200, manufactured by 3M) such that the solid concentration was 20.0% by mass to prepare a diluent (9).

The compound (G) was dissolved in hydrofluoroether (Novec HFE-7200, manufactured by 3M) such that the solid concentration was 20.0% by mass to prepare a diluent (10).

The compound (H) was dissolved in hydrofluoroether (Novec HFE-7200, manufactured by 3M) such that the solid concentration was 20.0% by mass to prepare a diluent (11).

The compound (J) was dissolved in hydrofluoroether (Novec HFE-7200, manufactured by 3M) such that the solid concentration was 20.0% by mass to prepare a diluent (12).

The compound (K) was dissolved in hydrofluoroether (Novec HFE-7200, manufactured by 3M) such that the solid concentration was 20.0% by mass to prepare a diluent (13).

(Preparation of Surface-Treating Agent)

The diluents (1) to (8) were mixed at the proportion shown in Table 1 below to prepare surface-treating agent 1 to 12. Surface-treating agents 1 to 4 are Examples, and surface-treating agents 5 to 12 are Comparative Examples.

TABLE 1

| Surface-treating agent | Diluent (1) | Diluent (2) | Diluent (3) | Diluent (4) | Diluent (5) | Diluent (6) | Diluent (7) | Diluent (8) |
|---|---|---|---|---|---|---|---|---|
| 1 | 80 | 20 | | | | | | |
| 2 | | | 80 | 20 | | | | |
| 3 | | | | | 50 | 50 | | |
| 4 | | | | | | | 50 | 50 |
| 5 | 100 | | | | | | | |
| 6 | | 100 | | | | | | |
| 7 | | | 100 | | | | | |
| 8 | | | | 100 | | | | |
| 9 | | | | | 100 | | | |
| 10 | | | | | | 100 | | |
| 11 | | | | | | | 100 | |
| 12 | | | | | | | | 100 |

(Formation of Surface-Treating Layer)

Surface-treating agents 1 to 12 were applied to a chemically tempered glass ("Gorilla" glass, manufactured by Corning Incorporated, thickness 0.7 mm) using a spin coater.

The spin coating conditions were 300 rpm for 3 seconds and 2,000 rpm for 30 seconds.

The coated glass was heated at 150° C. for 30 minutes in a thermostatic oven in air to form a cured film.

(Evaluation of Surface-Treating Layer Properties)

The properties of the surface-treating layers obtained by using the surface-treating agents 1 to 12 were evaluated as follows. The results are shown in Table 2.

<Static Contact Angle>
(Initial Evaluation)

First, as an initial evaluation, after the surface-treating layer was formed, the static water contact angle of the surface with which nothing was brought into contact yet was measured.

<Friction Resistance Test Against Eraser>

Using a rubbing tester (manufactured by Shinto Scientific Co., Ltd.), the water-resisting contact angle was measured every 2,500 rubs under the following conditions, and the test was continued until it reached 15,000 rubs or until the angle became less than 100°. The test environment conditions were 25° C. and a humidity of 40% RH.

Eraser: Raber Eraser (manufactured by Minoan)
Contact area: 6 mmφ
Moving distance (one way): 30 mm
Moving speed: 3,600 mm/min
Load: 1 kg/6 mmφ

TABLE 2

| | 0 times | 2,500 times | 5,000 times | 7,500 times | 10,000 times | 12,500 times | 15,000 times |
|---|---|---|---|---|---|---|---|
| Surface-treating agent 1 | 112 | 114 | 113 | 112 | 104 | 98 | — |
| Surface-treating agent 2 | 113 | 112 | 112 | 110 | 105 | 101 | 100 |
| Surface-treating agent 3 | 112 | 111 | 111 | 110 | 107 | 107 | 100 |
| Surface-treating agent 4 | 113 | 113 | 110 | 108 | 103 | 100 | 94 |
| Surface-treating agent 5 | 114 | 112 | 109 | 92 | — | — | — |
| Surface-treating agent 6 | 114 | 107 | 94 | — | — | — | — |
| Surface-treating agent 7 | 114 | 116 | 116 | 115 | 114 | 99 | — |
| Surface-treating agent 8 | 113 | 114 | 112 | 110 | 106 | 104 | 96 |
| Surface-treating agent 9 | 113 | 108 | 103 | 103 | 95 | — | — |
| Surface-treating agent 10 | 112 | 111 | 110 | 109 | 98 | — | — |
| Surface-treating agent 11 | 114 | 112 | 98 | — | — | — | — |
| Surface-treating agent 12 | 113 | 114 | 112 | 102 | 99 | — | — |

(Preparation of Surface-Treating Agent)

The diluents (9) to (13) were mixed at the proportion shown in Table 3 below to prepare surface-treating agent 13 to 21. Surface-treating agents 13 to 15 are Examples, and surface-treating agents 16 to 21 are Comparative Examples.

| Surface-treating agent | Diluent (9) | Diluent (10) | Diluent (11) | Diluent (12) | Diluent (13) |
|---|---|---|---|---|---|
| 13 | 40 | | 60 | | |
| 14 | | 80 | 20 | | |
| 15 | | 70 | | 30 | |
| 16 | | 80 | 20 | | |
| 17 | 100 | | | | |
| 18 | | 100 | | | |
| 19 | | | 100 | | |
| 20 | | | | 100 | |
| 21 | | | | | 100 |

(Formation of Surface-Treating Layer)

Surface-treating agents 13 to 21 were applied to a chemically tempered glass ("Gorilla" glass, manufactured by Corning Incorporated, thickness 0.7 mm) using a vacuum deposition method.

The conditions of the vacuum deposition method were a resistance heating type vapor deposition machine (manufactured by Shincron Co., Ltd.), a chamber size of 1900 mmφ, a vacuum degree of 5.0 E−05, a current value of 240 A, a voltage of 10 V, and a substrate temperature of 40° C.

The coated glass was heated at 150° C. for 30 minutes in a thermostatic oven in air to form a cured film.

(Evaluation of Surface-Treating Layer Properties)

The properties of the surface-treating layers obtained by using the surface-treating agents 13 to 21 were evaluated. The measurement of the static contact angle and the friction resistance test against eraser were performed in the same manner as in the surface-treating agents 1 to 12. The results are shown in Table 4.

TABLE 4

|  | 0 time | 2,500 times | 5,000 times | 7,500 times | 10,000 times | 12,500 times | 15,000 times |
|---|---|---|---|---|---|---|---|
| Surface-treating agent 13 | 115 | 116 | 116 | 114 | 111 | 109 | 99 |
| Surface-treating agent 14 | 114 | 115 | 115 | 113 | 110 | 103 | 97 |
| Surface-treating agent 15 | 115 | 114 | 112 | 108 | 104 | 101 | 100 |
| Surface-treating agent 16 | 113 | 110 | 104 | 99 | — | — | — |
| Surface-treating agent 17 | 112 | 112 | 107 | 108 | 86 | — | — |
| Surface-treating agent 18 | 114 | 107 | 109 | 82 | — | — | — |
| Surface-treating agent 19 | 114 | 112 | 109 | 105 | 103 | 79 | — |
| Surface-treating agent 20 | 114 | 113 | 110 | 108 | 104 | 80 | — |
| Surface-treating agent 21 | 113 | 76 | — | — | — | — | — |

INDUSTRIAL APPLICABILITY

The surface-treating agent of the present disclosure can be suitably utilized to form a surface-treating layer on the surface of a variety of base materials, in particular optical members for which transmission is required.

What is claimed is:

1. A surface-treating agent comprising a fluoropolyether group-containing silane compound (A) and a fluoropolyether group-containing silane compound (B), wherein the fluoropolyether group-containing silane compound (A) is represented by formula (1):

$$R^{F1}_\alpha\!-\!X^A\!-\!R^{Si}_\beta \tag{1}$$

wherein the fluoropolyether group-containing silane compound (B) is represented by formula (1'):

$$R^{F1}_\alpha\!-\!X^A\!-\!R^{Si}_\beta \tag{1'}$$

wherein in the fluoropolyether group-containing silane compound (A):

$R^{F1}$ is $R^{f1}\!-\!R^F\!-\!O_q\!-\!$;

$Rf^1$ is each independently at each occurrence a $C_{1-16}$ alkyl group optionally substituted with one or more fluorine atoms;

$R^F$ is each independently at each occurrence represented by $R^{F11}$;

$R^{F11}$ is represented by formula:

$$-(OC_6F_{12})_a\!-\!(OC_5F_{10})_b\!-\!(OC_4F_8)_c\!-\!(OC_3R^{Fa}_6)_d\!-\!(OC_2F_4)_e\!-\!(OCF_2)_f\!-$$

wherein $R^{Fa}$ is each independently at each occurrence a hydrogen atom, a fluorine atom, or a chlorine atom; and a, b, c, d, e and f are each independently at each occurrence an integer of 0 to 200, the sum of a, b, c, d, e and f is 1 or more, and the occurrence order of the respective repeating units in parentheses with a, b, c, d, e or f is not limited in the formula;

q is each independently at each occurrence 0 or 1;

$X^A$ is a single bond or a di- to decavalent organic group;

$R^{Si}$ is each independently at each occurrence a group having a Si atom bonded to a hydrolyzable group and is each independently at each occurrence represented by the following formula (S11) or (S12):

$$-C(Z^1\!-\!SiR^{21}_{p1}R^{22}_{q1})_3 \tag{S11}$$

$$Si(Z^1\!-\!SiR^{21}_{p1}R^{22}_{q1})_3 \tag{S12}$$

$Z^1$ is each independently at each occurrence a $C_{1-6}$ alkylene group, $-(CH_2)_{z1}\!-\!O\!-\!(CH_2)_{z2}\!-$, or $-(CH_2)_{z3}$-phenylene-$(CH_2)_{z4}\!-$;

z1 is independently at each occurrence an integer 1 to 6;

z2 is independently at each occurrence an integer 0 to 6;

z3 and z4 are each independently at each occurrence an integer of 0 to 6;

$R^{21}$ is each independently at each occurrence a hydroxyl group or a hydrolyzable group;

$R^{22}$ is each independently at each occurrence a hydrogen atom or a monovalent organic group;

p1 is each independently at each occurrence an integer of 1 to 3; and q1 is each independently at each occurrence an integer of 0 to 2;

α is an integer of 1 to 9; and

β is an integer of 1 to 9;

wherein in the fluoropolyether group-containing silane compound (B):

$R^{F1}$ is $Rf^1\!-\!R^F\!-\!O_q\!-$;

$Rf^1$ is a $C_{1-16}$ alkyl group optionally substituted with one or more fluorine atoms;

$R^F$ is each independently at each occurrence represented by $R^{F21}$;

$R^{F21}$ is represented by formula:

$$-(OC_6F_{12})_a\!-\!(OC_5F_{10})_b\!-\!(OC_4F_8)_c\!-\!(OC_3R^{Fa}_6)_d\!-\!(OC_2F_4)_e\!-\!(OCF_2)_f\!-$$

a, b, c, d, e, f, and $R^{Fa}$ each have the same meaning as in $R^{F11}$, provided that the structure of each of the repeating units in $R^{F21}$ is same as the structure of each of the repeating units in $R^{F11}$; and q is each independently at each occurrence 0 or 1;

$X^A$ is each independently at each occurrence a single bond or a di- to decavalent organic group;

$R^{Si}$ is each independently at each occurrence a group having a Si atom bonded to a hydrolyzable group and is each independently at each occurrence represented by the following formula (S2), (S3), or (S4):

$$-C(Z^1\!-\!SiR^{21}_{p1}R^{22}_{q1})_2R^{e1} \tag{S2}$$

$$-Si(Z^1\!-\!SiR^{21}_{p1}R^{22}_{q1})_2R^{e1} \tag{S3}$$

$$-N(Z^1\!-\!SiR^{21}_{p1}R^{22}_{q1})_2 \tag{S4}$$

wherein $Z^1$, $R^{21}$, $R^{22}$, p1, and q1 have the same meaning as in formula (S11) and formula (S12); and $R^{e1}$ is each independently a hydrogen atom, a hydroxyl group, or a monovalent organic group, α is an integer of 1 to 9; and
β is an integer of 1 to 9;
provided that a case is excluded, where $R^{Si}$ in the fluoropolyether group-containing silane compound (A) is represented by formula (S12) and $R^{Si}$ in the fluoropolyether group-containing silane compound (B) is represented by formula (S3), and the structure or the value of $R^{f1}$, $R^{f2}$, p, q, $R^{F11}$, $X^A$, α, β, γ, $Z^1$, $R^{21}$, $R^{22}$, p1, and q1 of the fluoropolyether group-containing silane compound (A) are completely same as the structure or the value of $R^{f1}$, $R^{f2}$, p, q, $R^{F21}$, $X^A$, α, β, γ, $Z^1$, $R^{21}$, $R^{22}$, p1, and q1 of the fluoropolyether group-containing silane compound (B), respectively.

2. The surface-treating agent according to claim 1, wherein $R^{Fa}$ in the fluoropolyether group-containing silane compound (A) and/or in the fluoropolyether group-containing silane compound (B) is a fluorine atom.

3. The surface-treating agent according to claim 1, wherein $R^{F11}$ and $R^{F21}$ in the fluoropolyether group-containing silane compound (A) and/or in the fluoropolyether group-containing silane compound (B) are groups represented by formula (f1), (f2), (f3), (f4), or (f5):

—(OC$_3$F$_6$)$_d$—     (f1)

wherein d is an integer of 1 to 200;

—(OC$_4$F$_8$)$_c$—(OC$_3$F$_6$)$_d$—(OC$_2$F$_4$)$_e$—(OCF$_2$)$_f$—     (f2)

wherein c and d are each independently an integer of 0 to 30;
e and f are each independently an integer of 1 to 200;
the sum of c, d, e, and f is an integer of 10 to 200; and
the occurrence order of the respective repeating units in parentheses with the subscript c, d, e, or f is not limited in the formula;

—(R$^6$—R$^7$)$_g$—     (f3)

wherein $R^6$ is OCF$_2$ or OC$_2$F$_4$;
$R^7$ is a group selected from OC$_2$F$_4$, OC$_3$F$_6$, OC$_4$F$_8$, OC$_5$F$_{10}$, and OC$_6$F$_{12}$, or is a combination of two or three groups selected from these groups; and
g is an integer of 2 to 100;

—(OC$_6$F$_{12}$)$_a$—(OC$_5$F$_{10}$)$_b$—(OC$_4$F$_8$)$_c$—(OC$_3$F$_6$)$_d$—(OC$_2$F$_4$)$_e$—(OCF$_2$)$_f$—     (f4)

wherein e is an integer of 1 or more and 200 or less, a, b, c, d, and f are each independently an integer of 0 or more and 200 or less, the sum of a, b, c, d, e, and f is at least 1, and the occurrence order of the respective repeating units in parentheses with a, b, c, d, e, or f is not limited in the formula; and —(OC$_6$F$_{12}$)$_a$—(OC$_5$F$_{10}$)$_b$—(OC$_4$F$_8$)$_c$—(OC$_3$F$_6$)$_d$—(OC$_2$F$_4$)$_e$—(OCF$_2$)$_f$—     (f5)

wherein f is an integer of 1 or more and 200 or less, a, b, c, d, and e are each independently an integer of 0 or more and 200 or less, the sum of a, b, c, d, e, and f is at least 1, and the occurrence order of the respective repeating units in parentheses with a, b, c, d, e, or f is not limited in the formula.

4. The surface-treating agent according to claim 1, wherein the number-average molecular weights of $R^{F1}$ in the fluoropolyether group-containing silane compound (A) and/or in the fluoropolyether group-containing silane compound (B) is in a range of 500 to 30,000.

5. The surface-treating agent according to claim 1, wherein in $R^F$, e and f in the fluoropolyether group-containing silane compound (A) and/or in the fluoropolyether group-containing silane compound (B) are each independently an integer of 1 to 200; and
a ratio of e to f is in a range of 0.1 to 10.

6. The surface-treating agent according to claim 1, wherein α, and β in the fluoropolyether group-containing silane compound (A) and/or in the fluoropolyether group-containing silane compound (B) are each 1.

7. The surface-treating agent according to claim 1, wherein $X^A$ in the fluoropolyether group-containing silane compound (A) and/or in the fluoropolyether group-containing silane compound (B) is each independently at each occurrence
a C$_{1-20}$ alkylene group,
—(CH$_2$)$_{s5}$—X$^{53}$—,
—(CH$_2$)$_{s5}$—X$^{53}$—(CH$_2$)$_{t5}$—
—X$^{54}$—, or
—X$^{54}$—(CH$_2$)$_{t5}$—,
wherein
s5 is an integer of 1 to 20;
$X^{53}$ is —O—, —CONR$^{54}$—, or —O—CONR$^{54}$—;
$R^{54}$ each independently represents a hydrogen atom, a phenyl group, or a C$_{1-6}$ alkyl group;
t5 is an integer of 1 to 20; and
$X^{54}$ is —C(O)O—, —CONR$^{54}$—, or —O—CONR$^{54}$—.

8. The surface-treating agent according to claim 1, wherein p1 in the fluoropolyether group-containing silane compound (A) and/or in the fluoropolyether group-containing silane compound (B) is 3.

9. The surface-treating agent according to claim 1, wherein the fluoropolyether group-containing silane compound (A) is contained in an amount of 5% by mass or more based on a total amount of the fluoropolyether group-containing silane compound (A) and the fluoropolyether group-containing silane compound (B).

10. The surface-treating agent according to claim 1, wherein the fluoropolyether group-containing silane compound (A) is contained in an amount of 5 to 95% by mass based on a total amount of the fluoropolyether group-containing silane compound (A) and the fluoropolyether group-containing silane compound (B).

11. The surface-treating agent according to claim 1, wherein $R^{Si}$ in the fluoropolyether group-containing silane compound (B) is represented by formula (S2).

12. The surface-treating agent according to claim 1, wherein $R^{Si}$ in the fluoropolyether group-containing silane compound (B) is represented by formula (S3).

13. The surface-treating agent according to claim 1, wherein $R^{Si}$ in the fluoropolyether group-containing silane compound (B) is represented by formula (S4).

14. The surface-treating agent according to claim 1, wherein $R^{Si}$ in the fluoropolyether group-containing silane compound (A) is represented by formula (S11), and $R^{Si}$ in the fluoropolyether group-containing silane compound (B) is represented by formula (S2), (S3), or (S4).

15. The surface-treating agent according to claim 1, wherein $R^{Si}$ in the fluoropolyether group-containing silane compound (A) is represented by formula (S12), and $R^{Si}$ in the fluoropolyether group-containing silane compound (B) is represented by formula (S2) or (S4).

16. The surface-treating agent according to claim 1, further comprising one or more other components selected from the group consisting of a fluorine-containing oil, a silicone oil, and a catalyst.

17. The surface-treating agent according to claim 1, further comprising a solvent.

18. The surface-treating agent according to claim 1, which is used as an antifouling coating agent or a water-proof coating agent.

19. The surface-treating agent according to claim 1, which is for vacuum deposition.

* * * * *